(12) United States Patent
Kawai et al.

(10) Patent No.: US 8,306,933 B2
(45) Date of Patent: Nov. 6, 2012

(54) INFORMATION PROVIDING SYSTEM, METHOD OF PROVIDING INFORMATION AND PROGRAM FOR PROVIDING INFORMATION

(75) Inventors: Takao Kawai, Tokyo (JP); Shinichi Doi, Tokyo (JP); Shinichi Ando, Tokyo (JP); Kunihiko Sadamasa, Tokyo (JP); Yoshiko Matsukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 953 days.

(21) Appl. No.: 12/301,899

(22) PCT Filed: May 21, 2007

(86) PCT No.: PCT/JP2007/060376
§ 371 (c)(1),
(2), (4) Date: Jan. 29, 2009

(87) PCT Pub. No.: WO2007/136035
PCT Pub. Date: Nov. 29, 2007

(65) Prior Publication Data
US 2009/0164566 A1    Jun. 25, 2009

(30) Foreign Application Priority Data
May 22, 2006   (JP) ................. 2006-141526

(51) Int. Cl.
*G06F 17/00* (2006.01)
*G06N 5/00* (2006.01)
(52) U.S. Cl. .......................................... 706/45
(58) Field of Classification Search .............. 706/45, 706/50, 62
See application file for complete search history.

(56) References Cited

U.S. PATENT DOCUMENTS

| 5,819,271 | A | 10/1998 | Mahoney et al. |
|---|---|---|---|
| 2002/0174129 | A1 | 11/2002 | Aldrich et al. |
| 2003/0101341 | A1 | 5/2003 | Kettler, III et al. |
| 2005/0027556 | A1 | 2/2005 | Inagaki et al. |
| 2005/0216465 | A1 | 9/2005 | Dutta et al. |
| 2007/0204039 | A1* | 8/2007 | Inamdar ................. 709/225 |

FOREIGN PATENT DOCUMENTS

| JP | 06-236311 A | 8/1994 |
|---|---|---|
| JP | 11-250074 A | 9/1999 |
| JP | 2001-312502 A | 11/2001 |
| JP | 2002-132812 A | 5/2002 |
| JP | 2002-197186 A | 7/2002 |
| JP | 2005-063417 A | 3/2005 |
| JP | 2005-208901 A | 8/2005 |

* cited by examiner

*Primary Examiner* — Jeffrey A Gaffin
*Assistant Examiner* — Ilya Traktovenko
(74) *Attorney, Agent, or Firm* — Sughrue Mion, PLLC

(57) ABSTRACT

Disclosed is an information providing system comprising a receiving unit that receives an information request from a requester, a data storage unit that stores data, a detection processing unit that analyzes the content of the information request and extracts provision candidate data corresponding to the information request from the data storage unit, a responder output device to which the content of the information request and the provision candidate data are output, a responder input device that receives instruction information on whether or not the provision candidate data is to be provided, a response control unit that determines whether or not there is providable data based on the received instruction information and the provision candidate data, and an answer generating unit that generates answer data using the decision result by the response control unit.

8 Claims, 18 Drawing Sheets

FIG. 16

| DATA ID | CONTENT |
|---|---|
| D21 | THE CONCEPT OF TANAKA'S PROJECT IS A PROCESS IMPROVEMENT. THIS PROCESS IMPROVEMENT IS ... |
| D22 | AT TECHNICAL SEMINAR, NETWORK TROUBLES ARE POINTED OUT AS PROBLEMS. ONE OF EXAMPLES IS... |
| ... | |
| D35 | THE PERIOD OF TANAKA'S PROJECT IS ONE YEAR. NOTE THAT THE PROJECT WILL BE EXTENDED AS THE NEED ARISES... |
| ... | |
| D48 | REPORT THE PROGRESS OF THE PROJECT. THE DETAIL OF THE REPORT FORMAT IS... |

FIG. 18

ANSWER CANDIDATE OUTPUT AND INSTRUCTION INFORMATION RECEIVE WINDOW (C2)

INQUIRY: WHAT IS THE CONCEPT OF TANAKA'S PROJECT?
REQUESTER: YAMADA

| ANSWER CANDIDATE | ANSWER CANDIDATE PROVIDING PERMISSION | DATA ID | DATA PROVIDING PERMISSION |
|---|---|---|---|
| THE CONCEPT OF TANAKA'S PROJECT IS A PROCESS IMPROVEMENT. | ☐ | D21 | ☐ |
| THE PERIOD OF TANAKA'S PROJECT IS ONE YEAR. | ☐ | D35 | ☐ |

(C21, C22)

COMMENT ENTRY FIELD: _____ (C23)

SELECT CHECKBOX OF ANSWER CANDIDATE AND DATA TO BE PROVIDED, ENTER COMMENT IF ANY, AND PRESS THE RUN BUTTON.

[ RUN ] (C20)

INFORMATION PROVIDING SYSTEM, METHOD OF PROVIDING INFORMATION AND PROGRAM FOR PROVIDING INFORMATION

TECHNICAL FIELD

The present invention relates to an information providing system, an information providing method, and an information providing program, and more particularly to an information providing system, an information providing method, and an information providing program for providing information in response to a request for information.

BACKGROUND ART

As more and more electronic data becomes available for use, more and more data is saved in various information apparatuses such as individually owned personal computers, with an increasing need for an efficient information providing method.

Meanwhile, widespread use of computer networks leads to the introduction of information providing means for use on computer networks. As the information providing means, various information providing systems for collecting, accumulating, and sharing information, such as an electronic bulletin board, groupware, and a file management system, are proposed.

A conventional typical information providing system receives the registration of data, such as knowledge information or document information, for sharing information to allow registered data to be made public to users who request the information (hereinafter termed requesters).

Although such an information providing system is efficient for publicizing and sharing information, providing necessary data requires users (for example, individuals) who provide information to the information providing system to create and register data that is made public.

However, it is not easy in practice to anticipate what individually-owned knowledge and know how the other users will need and to create in advance data, which will be made public. In addition, without motivations or financial incentives, users are not willing to create data for publication and register the created data even if they have knowledge and information. That is, such an information providing system requires an information providing user to create necessary data and to register, add, change, or delete data. An information providing user finds those operations cumbersome and feels reluctant to do so.

In general, data is managed in such an information providing system by set access rights to data to maintain information security.

It is therefore necessary to determine in advance which data is to be made public to which user and to appropriately set up access rights and security management.

However, classifying a large amount of data between data to be made public and data not to be made public in advance for future information requests and use puts a heavy load on an information providing user.

Data is dealt with in various units. For example, in case of a data unit being an information unit such as an electronic file, if there are a large number of files, classifying all files between those allowed to be made public and those not allowed to be made public requires considerable costs. To allow only a part of a file to be made public, the more detailed setting and management of files are required and the operation becomes still more cumbersome.

Even if data is registered with above-described problems existing, it is difficult to provide appropriate information efficiently from the registered data to a requester while maintaining security.

An information providing system designed for information retrieval, described, for example, in Patent Document 1, is known as a system for efficiently using accumulated data while maintaining the security of it. This conventional information providing system comprises receiving means for receiving a query request that includes a query condition issued from a requester; a database that stores plural items of data; detection means for detecting data, corresponding to a query condition, from the database according to a query request; and output means for outputting exsistence information on the corresponding data in the database, as well as personal information on a person who has a predetermined right, to a requester who has made a request for, but has no access right to, the corresponding data. This conventional information processing system operates as follows.

First, the receiving means receives a query request sent from the terminal device of the requester and including a query condition.

The detection means detects data, corresponding to the query condition specified by the received query request, from the database.

Next, the output means references the access right for the detected data and, if the requester who has sent the query request has the access right, outputs the detected data to the terminal device of the requester who has sent the query request. If the requester who has sent the query request has no access right, the output means outputs information on the location of the detected data, as well as information on a person who has the access right to the information, to the terminal device of the requester who has sent the query request.

Patent Document 2 discloses the configuration of an information providing system that comprises means that is used by a special person in charge of engineering for performing an operation to confirm a query accepted from the requester's PC via electronic mail, an operation to access a private database, in which technical information not accessible to the requester is stored, for detecting technical information, an operation to create an answer based on the detected technical information, and an operation to send the answer to the requester's PC via electronic mail. This information providing system also accumulates answer log when the answer is sent.

Patent Document 1: Japanese Patent Publication Kokai JP-A No. 2005-208901
Patent Document 2: Japanese Patent Publication Kokai JP-A No. 2001-312502
Patent Document 3: Japanese Patent Publication Kokai JP-A No. 2002-132812

SUMMARY OF THE DISCLOSURE

The following analysis is given by the present invention.

However, a conventional information providing system, such as the one disclosed in above-described Patent Document 1, sets an appropriate access right to data stored in a database in advance and, if data is detected but a requester who has sent a query request has not an access right to it, provides only information on the location of the detected data and information on a person who has an access right in order to maintain security. The system does not provide the data, corresponding to the query request, to the requester.

In this case, to get data corresponding to the query request, the requester (requester who has no access right) must confirm the provided information on the existence of the detected data and on a person who has an access right and, after that, issue another request to the person who has an access right to the data to request for the data. The requester finds this procedure cumbersome.

In addition, the information providing system requires the person, who receives the request from the requester and has the access right, to find the corresponding data and respond to the request.

Meanwhile, a conventional information providing system disclosed, for example, in Patent Document 2 given above collects a request from a requester and requests the person in charge, who is able to access a private database, to confirm the request. Because the person in charge is responsible for operations for all databases such as a search, creation of an answer, and transmission of the answer, the operation is complicated and the efficiency is low.

It is an object of the present invention to provide an information providing system, an information providing method, and an information providing program that provide information efficiently while maintaining security.

An information providing system in accordance with one aspect of the present invention comprises: receiving means that receives an information request from a requester, a data storage unit that stores data, detection processing means that analyzes the content of the information request and extracts provision candidate data, which is a candidate for an answer to be provided to the requester, from the data storage unit in response to the information request, means that outputs the content of the information request and the provision candidate data to a person (hereinafter termed a responder) who has an access right to the extracted provision candidate data, input means that receives instruction information on whether or not the provision candidate data is to be provided, response control means that decides if there is providable data based on the received instruction information and the provision candidate data, and answer generating means that generates answer data using the decision result by the response control means.

The information providing system with such a configuration extracts provision candidate data, which corresponds to the information request, from stored data and, after that, provides the content of the information request and the provision candidate data to the responder, receives the instruction information, which indicates whether or not the provision candidate data is to be provided, as an input, determines whether or not there is providable data based on the received instruction information and the provision candidate data, and generates answer data to attain the object of the present invention.

An information processing system of the present invention comprises a data processing device and a data storage unit wherein the data processing device comprises extraction means that searches the data storage unit based on an information request received from a requester terminal and extracts provision candidate data, which corresponds to the information request, from the data storage unit; and control means that receives information on permission or non-permission of information provision regarding the extracted provision candidate data from a responder, creates answer data for the information request based on the information on permission or non-permission of information provision and the extracted provision candidate data, and controls sending of the created answer data to the requester terminal, and the created answer data is sent to the requester as information.

The information processing system of the present invention may be configured in such a way that a window for confirming the permission or non-permission of information provision regarding the extracted provision candidate data is output to the responder and, on the window, the content of the information request is displayed and, at the same time, an selection is made whether to provide the provision candidate data or to provide the information.

The information processing system of the present invention may be configured in such a way that the information providing system further comprises a consolidated processing device that comprises means that receives an information request from a requester via a network and delivers the information request to a corresponding data processing device; and means that creates an answer based on data, which is extracted by the delivery destination computer and to which a permission for information provision is given by a responder, and sends the created answer to the requester.

An information processing system in another aspect of the present invention comprises a data processing device and a data storage unit that stores data wherein the data processing device comprises receiving means that receives an information request from a requester terminal; detection processing means that analyzes a content of the information request received by the receiving means, searches data stored in the data storage unit for a set of data related to the content of the information request, extracts a set of provision candidate data, which corresponds to the content of the information request and is a candidate for an answer to be provided to the requester, and outputs the set of provision candidate data as a detection processing result; response control means that receives the content of the information request and the detection processing result from the detection processing means, outputs the received data to a responder terminal, receives an input of instruction information that is input from the responder terminal and that indicates permission or non-permission of information provision of the provision candidate data produced as the detection processing result, determines whether or not there is providable data based on the detection processing result and the instruction information, and outputs providable data based on a determination result; and answer generating means that generates answer data from data received from the response control means and sends the answer data to the requester terminal as a response to the information request.

In the information processing system of the present invention, if it is determined that the detection processing result received from the detection processing means does not include provision candidate data, the response control means transfers data, which indicates that there is no data to be provided, to the answer generating means. If it is determined that the detection processing result received from the detection processing means includes provision candidate data, the response control means of the present invention supplies the content of the information request data to the responder terminal. The response control means, which has received the instruction information from the responder terminal, determines whether or not there is providable data based on the instruction information and the detection processing result and, if there is the providable data, supplies the providable data to the answer generating means and, if there is no providable data, supplies data, which indicates that there is no providable data, to the answer generating means.

The information processing system of the present invention further comprises a result storage unit that stores the content of the information request and the detection processing result wherein, when a request to display the content of the information request and the detection processing result, which are saved in the result storage unit, is entered from the responder terminal, the response control means reads the content of the information request and the detection processing result, which are saved in the result storage unit, according to the request from the responder terminal and outputs the data, which has been read, to the responder terminal.

In the information processing system of the present invention, either the response control means saves the content of the information request and the detection processing result, which are received from the detection processing means, in the result storage unit or the detection processing means saves the content of the information request and the detection processing result in the result storage unit and notifies the information on the saving destination to the response control means.

In the information processing system of the present invention, the data processing device is connected to the responder terminal via a network for communication, the data storage unit stores stored data and related responder information that is information for identifying responders. The system further comprises a requester information storage unit that stores requester information, which is information identifying requesters, and related communication information on requester terminals; and a responder information storage unit that stores the responder information and related communication information on responder terminals. The receiving means receives an input entered from the requester terminal via the network as an information request, assigns request identification information as information identifying the information request, identifies the requester information by referencing the requester information storage unit, and establishes a correspondence between the request identification information and the requester information. The detection processing means receives the information request, the request identification information, and the requester information from the receiving means, analyzes the content of the information request, searches data stored in the data storage unit for a set of data related to the content of the information request, extracts a set of provision candidate data, which corresponds to the information request data and is a candidate for an answer to be provided to the requester, from the set of related data, combines the extracted set of provision candidate data with attribute information that includes responder information related to data in the set of provision candidate data to create a detection processing result, and transfers the detection processing result, as well as the content of the information request, the request identification information, and the requester information to the response control means. The response control means identifies responder information corresponding to the provision candidate data for each provision candidate data by referencing the responder information storage unit based on the detection processing result received from the detection processing means, creates display data, which includes the content of the information request, the requester information, and the provision candidate data, for each responder and outputs the created display data to the corresponding responder terminal via the network, receives the instruction information that is from the responder terminal and that indicates permission or non-permission of information provision of the provision candidate data, determines whether or not there is providable data based on the instruction information and the detection processing result, and supplies the providable data as well as the request identification information to the answer generating means. The answer generating means generates answer data from the data received from the response control means and sends the answer data to the requester terminal, which corresponds to the requester information corresponding to the request identification information on the information request, via the network as a response to the information request.

The information processing system in another aspect of the present invention comprises a plurality of sets of the data processing device and the data storage unit. The data processing device comprises detection processing means that analyzes a content of an information request from a requester, searches data stored in the data storage unit for a set of data related to the content of the information request, extracts a set of provision candidate data, which corresponds to the content of the information request data and is a candidate for an answer to be provided to the requester, and outputs the extracted provision candidate data as a detection processing result; and response control means that outputs the content of the information request and the detection processing result from the detection processing means to a responder terminal, receives an input of instruction information that is entered from the responder terminal and that indicates permission or non-permission of information provision of the provision candidate data that is produced as the detection processing result, determines whether or not there is providable data based on the detection processing result and the instruction information, and outputs providable data based on a determination result. The system further comprises a consolidated processing device that is connected to the plurality of data processing devices and a plurality of requester terminals via a network and that comprises receiving means, delivery control means, and answer generating means, wherein the delivery control means delivers an information request from the requester terminal, which is received by the receiving means of the consolidated processing device, to one or more data processing devices and receives providable data that is searched for by the detection processing means of the data processing device and that is output from the response control means, and the answer generating means creates answer data and sends the created answer data to the requester terminal as a response to the information request.

In the information processing system of the present invention, a storage device connected to the consolidated processing device comprises a delivery destination storage unit that stores delivery information identifying the plurality of data processing devices, a result storage unit that stores processing results of the data processing devices, and a requester information storage unit that stores requester information, which is information identifying requesters, and related communication information on requester terminals. The receiving means of the consolidated processing device, receives an information request sent from the requester terminal via the network, assigns request identification information to the information request, identifies requester information by referencing the requester information storage unit, and establishes a correspondence between the request identification information and the requester information. The delivery control means identifies a plurality of data processing devices, which are delivery destinations, from the delivery information stored in the delivery destination storage unit and delivers the request identification information and the information request to the data processing devices via the network as a detection processing request. The detection processing means of the data processing device receives the detection processing request delivered from the consolidated processing device via the network, the detection processing means searches the data storage unit for a set of data related to the content of the information request, extracts a set of provision candidate data that corresponds to the information request and that is a candidate for an answer to be provided to the requester, combines the extracted set of provision candidate data with attribute information that includes responder information related to data in the set of provision candidate data to create a detection processing result, and sends the detection processing result, as well as the request identification information, to the delivery control means of the consolidated processing device. The delivery control means of the consolidated processing device receives the detection processing result created for the detection processing request, determines whether or not there is a data processing device that is a sending destination, to which a providable data request for requesting providable data is to be sent, according to the detection processing result, and if it is determined that there is a sending destination, sends the detection processing result, as well as the request identification information and the requester information, to the data processing device, which is determined to be the sending destination, via the network as the providable data request. The response control means of the data processing device, which has received the providable data request determines a responder of each provision candidate data from the detection processing result, creates display data, which includes the content of the information request data, requester information, and provision candidate data, for the responder, outputs the created display data to the responder terminal, and receives an input of instruction information on permission or non-permission of information provision of the provision candidate data, produced as the detection processing result, from the responder on the responder terminal, and the response control means determines providable data, based on the instruction information and the detection processing result, to produce providable data, and sends the providable data, as well as the request identification information, to the consolidated processing device. The consolidated processing device transfers the providable data, received from the response control means of the data processing device, to the delivery control means, the delivery control means collects providable data for the request identification information and transfers the collected providable data to the answer generating means. The answer generating means generates answer data from the data, received from the response control means, as a response to the information request data and sends the answer data to the requester terminal, which corresponds to the requester information corresponding to the request identification information on the information request data, via the network.

A method of the present invention is an information providing method for use by a system that comprises a data processing device and a data storage unit that stores data, wherein the data processing device performs the steps of:

searching the data storage unit based on an information request received from a requester terminal and extracting provision candidate data, which is a candidate for an answer to be provided to a requester in response to the information request, from the data storage unit; and receiving information on permission or non-permission of information provision regarding the extracted provision candidate data from a responder, creating answer data for the information request based on the information on permission or non-permission of information provision and the extracted provision candidate data, and controlling sending of the created answer data to the requester terminal, the created answer data being supplied as information provision to the requester.

In the present invention, the information providing method performed by the data processing device comprises:

(A) a step of receiving an information request from a requester terminal;

(B) a step of analyzing a content of the information request accepted in the step (A), searching data stored in the data storage unit for a set of data related to the content of the information request, extracting a set of provision candidate data which corresponds to the content of the information request, and outputting the set of provision candidate data as a detection processing result;

(C) a step of receiving the content of the information request and the detection processing result from the detection processing in the step (B), outputting them to a responder terminal, receiving an input of instruction information that is input from the responder terminal and that indicates permission or non-permission of information provision of the provision candidate data produced as the detection processing result, determining whether or not there is providable data based on the detection processing result and the instruction information, and outputting providable data based on a determination result; and (D) a step of generating answer data from the providable data and sending the answer data to the requester terminal as a response to the information request.

The information providing method of the present invention may be a method wherein the data processing device is connected to the responder terminal via a network for communication, the data storage unit stores stored data and related responder information that is information identifying responders, the system further comprises a requester information storage unit that stores requester information, which identifies each requester, and related communication information on requester terminals; and a responder information storage unit that stores the responder information and related communication information on responder terminals wherein in the step (A), the data processing device receives an input entered from the requester terminal via the network as the information request, assigns request identification information as information identifying the information request, identifies the requester information by referencing the requester information storage unit, and establishes a correspondence between the request identification information and the requester information, in the step (B), the data processing device receives the information request, the request identification information, and the requester information from the step (A), analyzes the content of the information request, searches data stored in the data storage unit for a set of data related to the content of the information request, extracts a set of provision candidate data corresponding to information request data from the set of related data, combines the extracted set of provision candidate data with attribute information that includes responder information related to data in the set of provision candidate data to create a detection processing result, and outputs the detection processing result, as well as the content of the information request, the request identification information, and the requester information, in the step (C), the data processing device identifies responder information corresponding to the provision candidate data for each provision candidate data by referencing the responder information storage unit based on the detection processing result obtained from the step (B), creates display data, which includes the content of the information request, the requester information, and the provision candidate data, for each responder and outputs the created display data to the corresponding responder terminal via the network, receives the instruction information that is from the responder terminal and that indicates permission or non-permission of information provision of the provision candidate data, determines whether or not there is providable data based on the instruction information and the detection processing result, and outputs the providable data as well as the request identification information and in the step (D), the data processing device generates answer data from the data that is output in the step (C) and sends the answer data to the requester terminal, which corresponds to the requester information corresponding to the request identification information on the information request, via the network as a response to the information request.

The method of the present invention may further comprise the step of:

delivering, by a consolidated processing device, an information request, received from the responder terminal, to the one or more data processing devices, the consolidated processing device being connected to a plurality of the data processing devices and a plurality of the requester terminals via a network wherein the data processing device performs the steps of:

analyzing a content of the information request received from a requester, searching data stored in the data storage unit for a set of data related to the content of the information request, extracting a set of provision candidate data corresponding to the content of the information request, and outputting the extracted set of provision candidate data as a detection processing result; and outputting the content of the information request and the detection processing result to a responder terminal, receiving an input of instruction information that is entered from the responder terminal and that indicates permission or non-permission of information provision of the provision candidate data that is produced as the detection processing result, determining whether or not there is providable data based on the detection processing result and the instruction information, and outputting providable data based on a determination result, and wherein the providable data that is output from the data processing device is received, answer data is created, and the created answer data is sent to the requester terminal as a response to the information request.

In a computer system comprising a data processing device and a data storage unit that stores data, a computer program of the present invention causes the data processing device to execute:

a processing of searching the data storage unit based on an information request received from a requester terminal and extracting provision candidate data, which is a candidate for an answer to be provided to a requester in response to the information request, from the data storage unit; and a processing of receiving information on permission or non-permission of information provision regarding the extracted provision candidate data from a responder, creating answer data for the information request based on the information on permission or non-permission of information provision and the extracted provision candidate data, sending the created answer data to the requester terminal, and supplying the created answer data to the requester as information.

In the present invention, the program causes the data processing device to execute:

(A) a processing of receiving an information request from a requester terminal;

(B) a detection processing of analyzing a content of the information request accepted in the process (A), searching data stored in the data storage unit for a set of data related to the content of the information request, extracting a set of provision candidate data which corresponds to the content of the information request, and outputting the set of provision candidate data as a detection processing result;

(C) a processing of receiving the content of the information request and the detection processing result from the detection process in the step (B) for output to a responder terminal, receiving an input of instruction information that is input from the responder terminal and that indicates permission or non-permission of information provision of the provision candidate data produced as the detection processing result, determining whether or not there is providable data based on the detection processing result and the instruction information, and outputting providable data based on a determination result; and (D) a processing of generating answer data from the providable data and sending the answer data to the requester terminal as a response to the information request.

The computer program of the present invention is a program, wherein the data processing device is connected to the responder terminal via a network for communication, the data storage unit stores stored data and related responder information that is information identifying responders, the system further comprises a requester information storage unit that stores requester information, which is information identifying each requester, and related communication information on requester terminals; and a responder information storage unit that stores the responder information and related communication information on responder terminals, the program causing the data processing device to execute the processing of:

in the processing (A), receiving an input entered from the requester terminal via the network as the information request, assigning request identification information as information identifying the information request, identifying the requester information by referencing the requester information storage unit, and establishing a correspondence between the request identification information and the requester information;

in the processing (B), receiving the information request, the request identification information, and the requester information from the process (A), analyzing the content of the information request, searching data stored in the data storage unit for a set of data related to the content of the information request, extracting a set of provision candidate data corresponding to information request data from the set of related data, combining the extracted set of provision candidate data with attribute information that includes responder information related to data in the set of provision candidate data to create a detection processing result, and outputting the detection processing result, as well as the content of the information request, the request identification information, and the requester information;

in the processing (C), identifying responder information corresponding to the provision candidate data for each provision candidate data by referencing the responder information storage unit based on the detection processing result received from the process (B), creating display data, which includes the content of the information request, the requester information, and the provision candidate data, for each responder and outputting the created display data to the corresponding responder terminal via the network, receiving the instruction information that is from the responder terminal and that indicates permission or non-permission of information provision of the provision candidate data, determining whether or not there is providable data based on the instruction information and the detection processing result, and outputting the providable data as well as the request identification information; and in the processing (D), generating answer data from the data that is output in the processing (C) and sending the answer data to the requester terminal, which corresponds to the requester information corresponding to the request identification information on the information request, via the network as a response to the information request.

MERITORIOUS EFFECTS OF THE INVENTION

The present invention allows information to be efficiently provided while maintaining security.

The reason is that, in the present invention, the information processing system extracts provision candidate data for a requester's information request, presents the extracted provision candidate data to a responder, receives the input of instruction information, which indicates whether or not the provision candidate data is to be provided, from the responder, determines whether or not there is providable data based on the provision candidate data and the instruction information to generate answer data, and provides the generated answer data to the requester. As a result, the responder can efficiently provide appropriate information simply by giving a simple instruction that indicates whether or not the provision candidate data is to be provided. This eliminates the need for the responder to execute processing in advance, thus reducing the load. In addition, the requester who makes an information request can simply get information from non-accessible data.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 16 is a diagram showing a first example of the present invention.

FIG. 18 is a diagram showing a second example of the present invention.

PREFERRED MODES OF THE INVENTION

Figure 1:
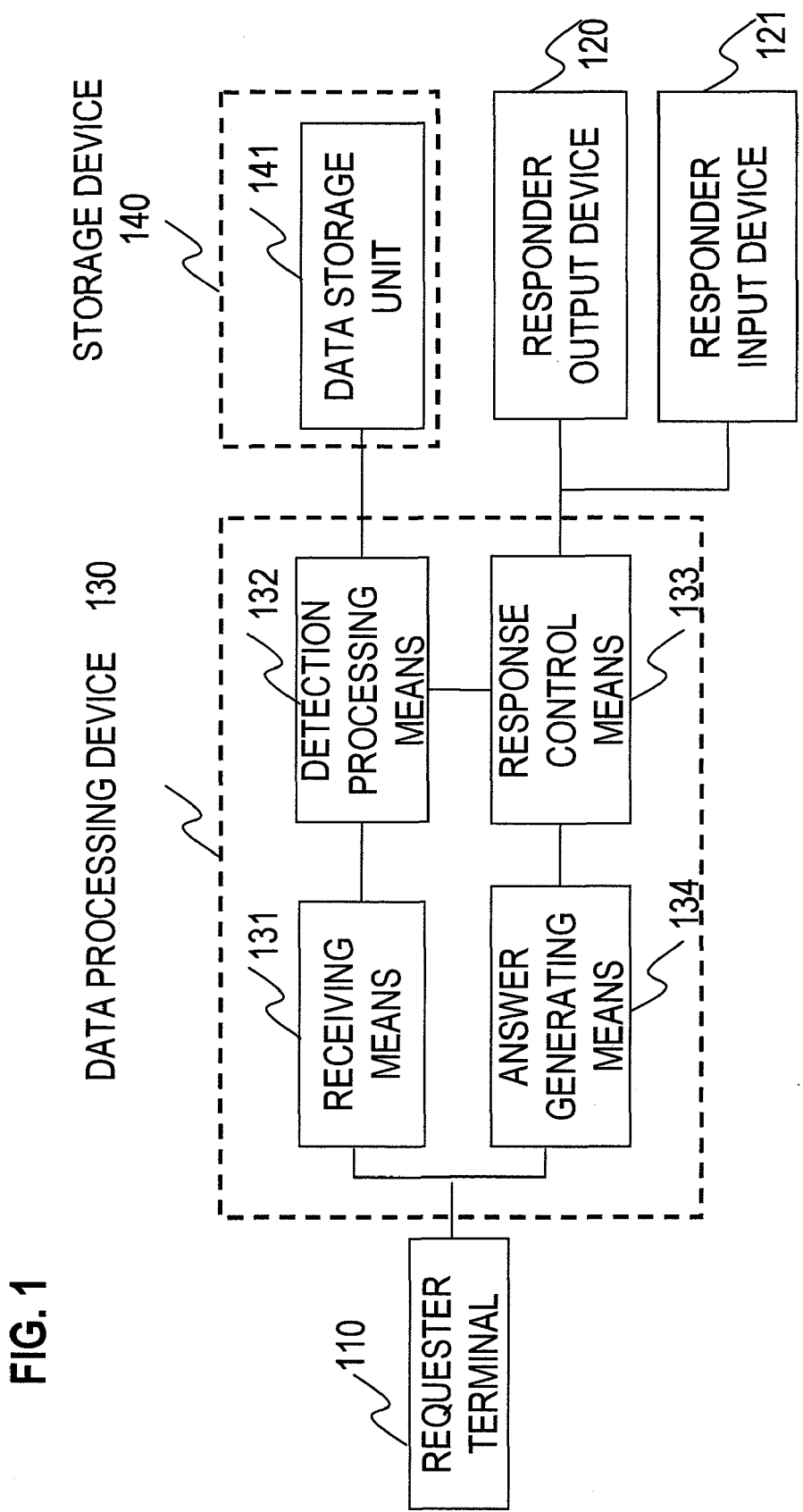
FIG. 1 is a block diagram showing the configuration of a first exemplary embodiment of the present invention.

Next, one of the most preferred modes (first exemplary embodiment) for carrying out the present invention will be described in detail with reference to the drawings. FIG. 1 is a diagram showing the first exemplary embodiment of the present invention.

Referring to FIG. 1, the first exemplary embodiment of the present invention comprises a requester terminal 110 which is a terminal device for receiving the input of a request from a requester and on which provided information is output, a responder output device 120 that outputs data to a responder, a responder input device 121 that receives the input of data from a responder, a data processing device 130 that operates under program control, and a storage device 140 that stores data.

The data processing device 130 comprises receiving means unit 131, detection processing means unit 132, response control means unit 133, and answer generating means unit 134.

The storage device 140 comprises a data storage unit 141 that stores data from which provided information is created.

The general operation of those means is as follows.

The receiving means 131 receives information request data entered via the requester terminal 110 and sent to the data processing device 130.

The detection processing means 132 analyzes the content of the information request data, received by the receiving means 131, and extracts a set of provision candidate data, which corresponds to the content of the information request data, from data stored in the data storage unit 141 of the storage device 140 (data is not required to be created for publication but may be raw data). The detection processing means 132 hands over the content of the information request data and the detection processing result to the response control means 133 with the result of the detection processing as the detection processing result.

The response control means 133 outputs the detection processing result, received from the detection processing means 132, as well as the content of the information request data, to the responder output device 120.

After that, the responder input device 121 receives instruction information on whether provision candidate data, extracted as a result of the detection processing, is to be provided and transfers the instruction information to the response control means 133.

Based on the detection processing result and the instruction information, the response control means 133 determines whether or not there is providable data and, based on the determination result, transfers the providable data to the answer generating means 134.

The answer generating means 134 generates answer data from the data received from the response control means 133 and sends the answer data to the requester terminal 110 as the response to the information request data.

The requester terminal 110 outputs the answer data received from the data processing device 130.

Figure 2:
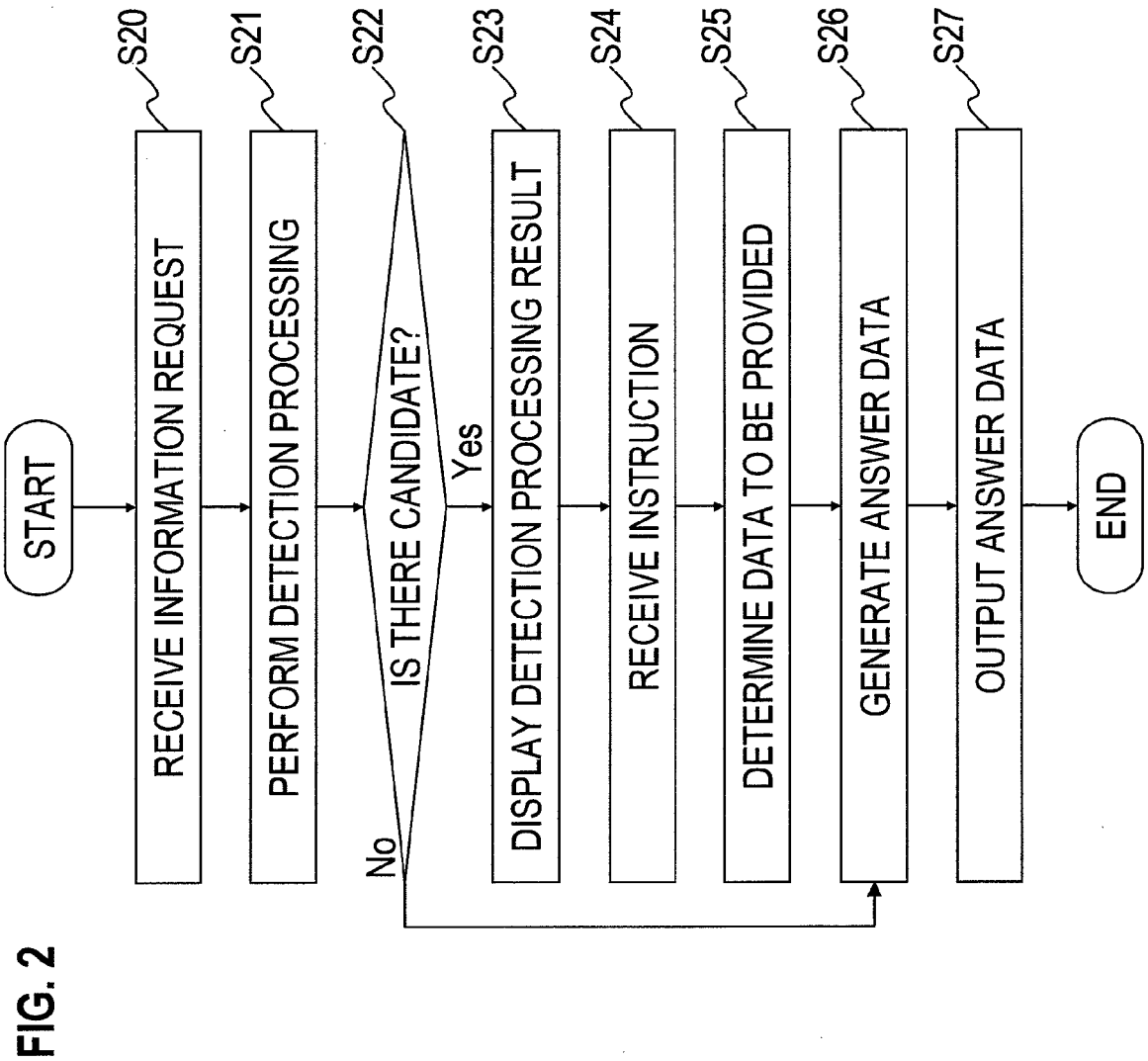
FIG. 2 is a flowchart showing the operation of the first exemplary embodiment of the present invention.

FIG. 2 is a flowchart showing the operation of the first exemplary embodiment of the present invention. Referring to FIG. 1 and FIG. 2, the following describes the general operation of this exemplary embodiment in detail.

First, the receiving means 131 receives information request data entered from the requester terminal 110 (step S20 in FIG. 2).

Next, the detection processing means 132 receives the information request data, received by the receiving means 131, and analyzes the content of the information request data.

Although no limitation imposed to the present invention, the detection processing means 132 performs the following processing when it extracts a set of provision candidate data corresponding to the content of the information request data. That is, the detection processing means 132 searches data, stored in the data storage unit 141 of the storage device 140, for data related to the analysis result of the content of the information request data, extracts the data that is searched for, and creates a set of related data. In addition, the detection processing means 132 extracts a set of provision candidate data, corresponding to the content of the information request data, from the set of related data as the detection processing result (step S21). The detection processing result, as well as the content of the information request data, is transferred to the response control means 133.

If it is determined that the detection processing result received from the detection processing means 132 does not include provision candidate data (No in step S22), the response control means 133 supplies data, which indicates that there is no provided data, to the answer generating means 134. The answer generating means 134 creates answer data from the received data (step S26).

If it is determined that the detection processing result received from the detection processing means 132 includes provision candidate data (Yes in step S22), the response control means 133 supplies the detection processing result, as well as the content of the information request data, to the responder output device 120. The responder output device 120 displays the detection processing result and the content of the information request data received from the response control means 133 (step S23). After they are displayed on the responder output device 120, the responder input device 121 receives the input of instruction information, which indicates whether or not the provision candidate data of the detection processing result will be provided, from the responder (step S24). The responder input device 121 transfers the received instruction information to the response control means 133.

The response control means 133, which has received the instruction information from the responder input device 121, determines whether or not there is providable data based on the instruction information and the detection processing result and supplies the providable data to the answer generating means 134 (step S25). If there is no providable data, the response control means 133 transfers data, which indicates that there is no providable data, to the answer generating means 134.

Next, the answer generating means 134 generates answer data from the data received from the response control means 133 (step S26). The generated answer data is transferred to the requester terminal 110.

Finally, the requester terminal 110 outputs the received answer data (step S27).

Next, the following describes the effect of the first exemplary embodiment of the present invention.

The information providing system in this exemplary embodiment extracts provision candidate data corresponding to a requester's information request, provides the extracted provision candidate data to a responder, and receives the input of instruction information, which indicates whether or not the provision candidate data will be provided, from the responder. After that, based on the provision candidate data and the instruction information, the information providing system determines whether or not there is providable data and generates answer data from the providable data, thus efficiently providing information while maintaining security.

Thus, the responder can efficiently provide appropriate information simply by giving a simple instruction without having to create storage data as public data in advance from the storage data and without having to execute the registration procedure. In addition, the information providing system in this exemplary embodiment extracts provision candidate data from the stored data in response to a requester's information request and provides the content of the information request, as well as provision candidate data, to the responder. And, based on a simple instruction from the responder, the information providing system determines whether there is providable data, generates answer data from the providable data, and provides the generated answer to the requester. Thus, the requester can efficiently get information from non-accessible data simply by making an information request. It is of course possible that the responder output device 120 and responder input device 121 is the output device and the input device of one responder terminal.

Next, a second exemplary embodiment of the present invention will be described in detail with reference to the drawings.

Figure 3:
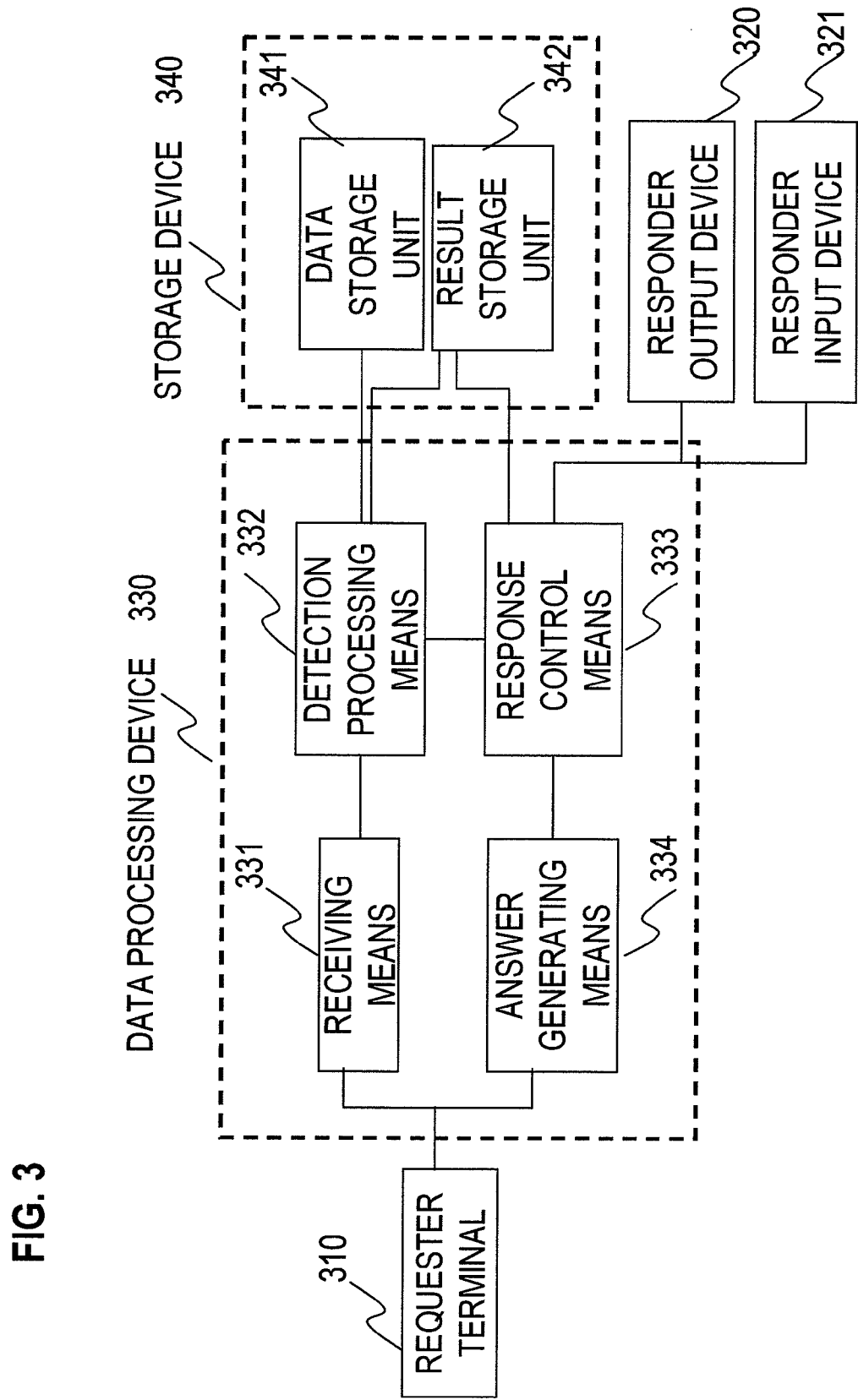
FIG. 3 is a block diagram showing the configuration of a second exemplary embodiment of the present invention.

Referring to FIG. 3, the configuration of the second exemplary embodiment of the present invention differs from the configuration of the first exemplary embodiment shown in FIG. 1 in that a result storage unit 342 for storing detection processing results is provided in a storage device 340.

A requester terminal 310, a data storage unit 341 of the storage device 340, and receiving means 331 and answer generating means 334 of a data processing device 330 are the same as the requester terminal 110, the data storage unit 141 of the storage device 140, and the receiving means 131 and answer generating means 134 of the data processing device 130 shown in FIG. 1. Therefore, the further description of those elements will be omitted but only the difference will be described.

Referring to FIG. 3, unlike the response control means 133 in the first exemplary embodiment shown in FIG. 1, response control means 333 saves the content of information request data and a detection processing result, both of which are received from the detection processing means 332, in the result storage unit 342.

Alternatively, the detection processing means 332 may save the content of the information request data and a detection processing result in the result storage unit 342 and notify information on the saving destination to the response control means 333.

After that, when request data is entered from a responder input device 321 to request the display of the content of the information request data and the detection processing result, both of which are saved in the result storage unit 342, and the entered request data is transferred to the response control means 333, the response control means 333 reads the content of the information request data and the detection processing result from the result storage unit 342 and supplies them to a responder output device 320.

The responder output device 320 displays the content of the information request data and the detection processing result supplied from the response control means 333. When instruction information on whether or not the provision candidate data, produced as a result of the detection processing, will be provided is entered from the responder input device 321 in response to the content of the display, the responder input device 321 transfers the instruction information to the response control means 333.

When the instruction information is received from the responder input device 321, the response control means 333 determines whether or not there is providable data based on the detection processing result and the instruction information and transfers the providable data to the answer generating means 334.

Figure 4:
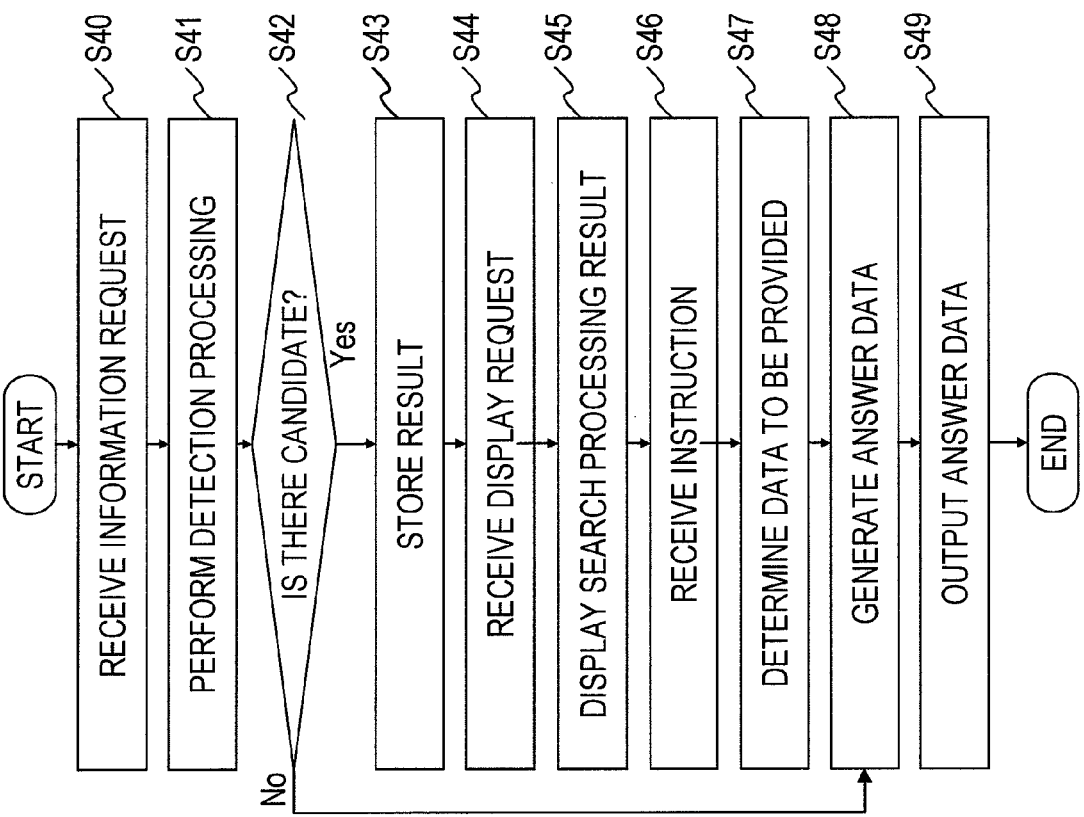
FIG. 4 is a flowchart showing the operation of the second exemplary embodiment of the present invention.

FIG. 4 is a flowchart showing the operation of the second exemplary embodiment of the present invention. The following describes the general operation of this exemplary embodiment in detail with reference to FIG. 3 and FIG. 4.

FIG. 4 is a flowchart similar to that of the example of the operation in the first exemplary embodiment shown in FIG. 2 except that new operation steps S43-S44 are added and the result of those steps is applied to steps S45-S46. The remaining steps S40-S42 correspond to the operation of steps S20-S22 in FIG. 2, and steps S47-S49 correspond to the operation of steps S25-S27 in FIG. 2, and so the further description is omitted.

In the first exemplary embodiment shown in FIG. 1, the detection processing means 132 extracts the detection processing result and, after that, the response control means 133 outputs the detection processing result, as well as the content of the information request data, to the responder output device 120. In contrast, in the second exemplary embodiment of the present invention, the response control means 333 shown in FIG. 3 saves the content of the information request data and the detection processing result, both of which are received from the detection processing means 332, in the result storage unit 342 after step S42 in FIG. 4 (step S43). To this step S43, multiple pieces of information request data may be processed.

Next, when request data to request the display of the content of the information request data and the detection processing result, both of which are saved in the result storage unit 342, is entered from the responder input device 321, the request data is given to the response control means 333 that receives the display request (step S44).

The response control means 333, which has accepted the display request, supplies the content of the information request data and the detection processing result, which have been saved in the result storage unit 342, to the responder output device 320. In this case, if multiple pieces of information request data have been issued up to this time, the response control means 333 supplies the content of the information request data and the detection processing result for each of the multiple pieces of information request data (step S45).

When the content of the information request data and the detection processing result are displayed on the responder output device 320 and, in response to the display content, instruction information indicating whether or not the provision candidate data of the detection processing result will be provided is entered by the responder from the responder input device 321, the responder input device 321 supplies the instruction information to the response control means 333 (step S46).

After that, the operation of steps S47-S49 is the same as that of steps S25-S27 in FIG. 2.

Next, the following describes the effect of the second exemplary embodiment of the present invention.

The information providing system in this exemplary embodiment saves the content of information request data, received from a requester, and the detection processing result, extracted from stored data, in the result storage unit to allow them to be displayed on the output device in response to a request from the responder, thus allowing the responder to respond to an information providing instruction any time.

Figure 5:
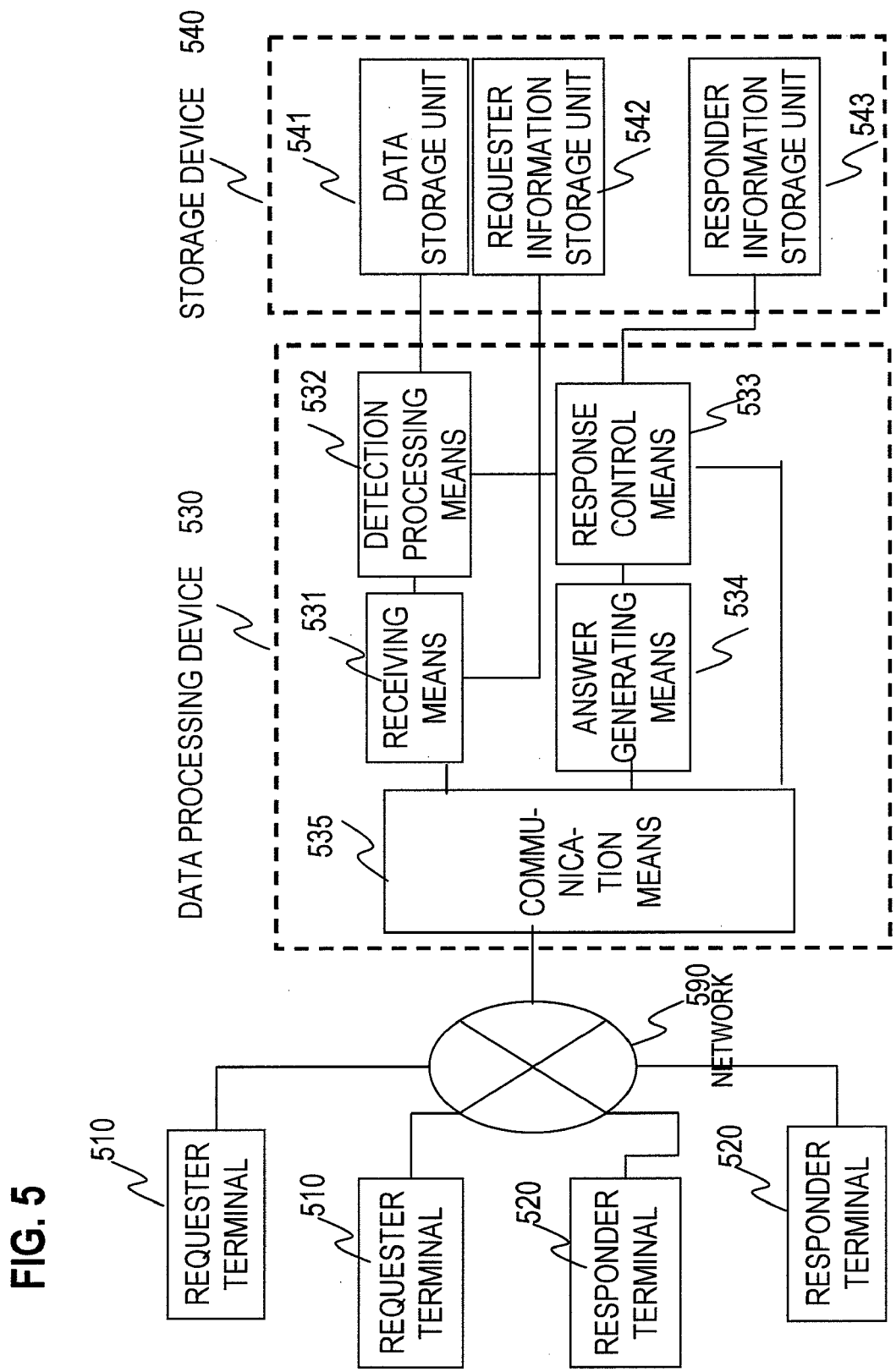
FIG. 5 is a block diagram showing the configuration of a third exemplary embodiment of the present invention.

Next, a third exemplary embodiment of the present invention will be described in detail with reference to the drawings. FIG. 5 is a diagram showing the configuration of the third exemplary embodiment of the present invention. The configuration of the third exemplary embodiment of the present invention is that, in addition to the data processing device and the storage device in the first exemplary embodiment in FIG. 1 and the second exemplary embodiment in FIG. 3, multiple requester terminals and multiple responder terminals are connected to the data processing device via a network.

Referring to FIG. 5, the third exemplary embodiment of the present invention comprises multiple requester terminals 510 that are terminal devices receiving an input from, and sending an output to, requesters, multiple responder terminals 520 that are terminals devices sending an output to, and receiving an input from, responders, a network 590, a data processing device 530, and a storage device 540.

Each of the requester terminal 510 and the responder terminal 520 is a terminal device that comprises input means, such as a keyboard and a mouse, for inputting data to the system, output means, such as a display and a printer, for outputting data from the system, and communication means for communicating with the data processing device.

The data processing device 530 comprises receiving means 531, detection processing means 532, response control means 533, and answer generating means 534, and further comprises communication means 535 that communicates with the terminals via the network 590.

The storage device 540 comprises a data storage unit 541 that stores data to be provided as information, a requester information storage unit 542, and a responder information storage unit 543.

The data storage unit 541 stores stored data and related responder information that is information identifying responders.

The requester information storage unit 542 stores requester information, which is information identifying requesters, and related communication information on requester terminals.

The responder information storage unit 543 stores responder information and related communication information on responder terminals.

Those means generally operate as follows.

The receiving means 531 receives an input, received from the requester terminal 510 via the communication means 535 and the network 590, as information request data. When the information request data is received, the receiving means 531 assigns request identification information as the information identifying the information request data and, by referencing the requester information storage unit 542, identifies the requester information and establishes the correspondence between the requester information and request identification information.

The detection processing means 532 receives the information request data, as well as the request identification information and requester information, from the receiving means 531 and analyzes the content of the information request data. After that, the detection processing means 532 performs the detection processing in such a way that it extracts a set of provision candidate data corresponding to the information request data from the data stored in the data storage unit 541 of the storage device 540 and, at the same time, extracts the attribute information including the responder information related to each piece of data in the provision candidate data set. The detection processing means 532 transfers the following to the response control means 533.

Content of information request data
Request identification information
Requester information, and
Detection processing result If the detection processing means 532 cannot extract provision candidate data and fails in the detection processing, the detection processing result indicates that there is no provision candidate data.

The response control means 533 determines the responder of each provision candidate data from the detection processing result received from the detection processing means 532, creates display data composed of the content of the information request data, the requester information, and the provision candidate data for each responder, and outputs the created display data to the corresponding responder terminal 520 via the communication means 535 and the network 590.

The responder terminal 520 receives the display data from the response control means 533, displays the received display data to the responder, and receives the input of instruction information, which indicates whether the provision candidate data of the detection processing result will be displayed, from the responder.

The responder terminal 520 transfers the received instruction information to the response control means 533.

The response control means 533 determines whether there is providable data based on the instruction information accepted from the responder terminal 520 and the detection processing result detected by the detection processing means 532, and transfers the providable data, as well as the request identification information, to the answer generating means 534.

The answer generating means 534 generates answer data from the data received from the response control means 533 and sends the generated answer data to the requester terminal 510, indicated by the requester information that corresponds to the request identification information of the information request data, as the response to the information request data via the network 590.

The requester terminal 510 outputs the answer data received from the data processing device 530 via the network 590.

Figure 6:
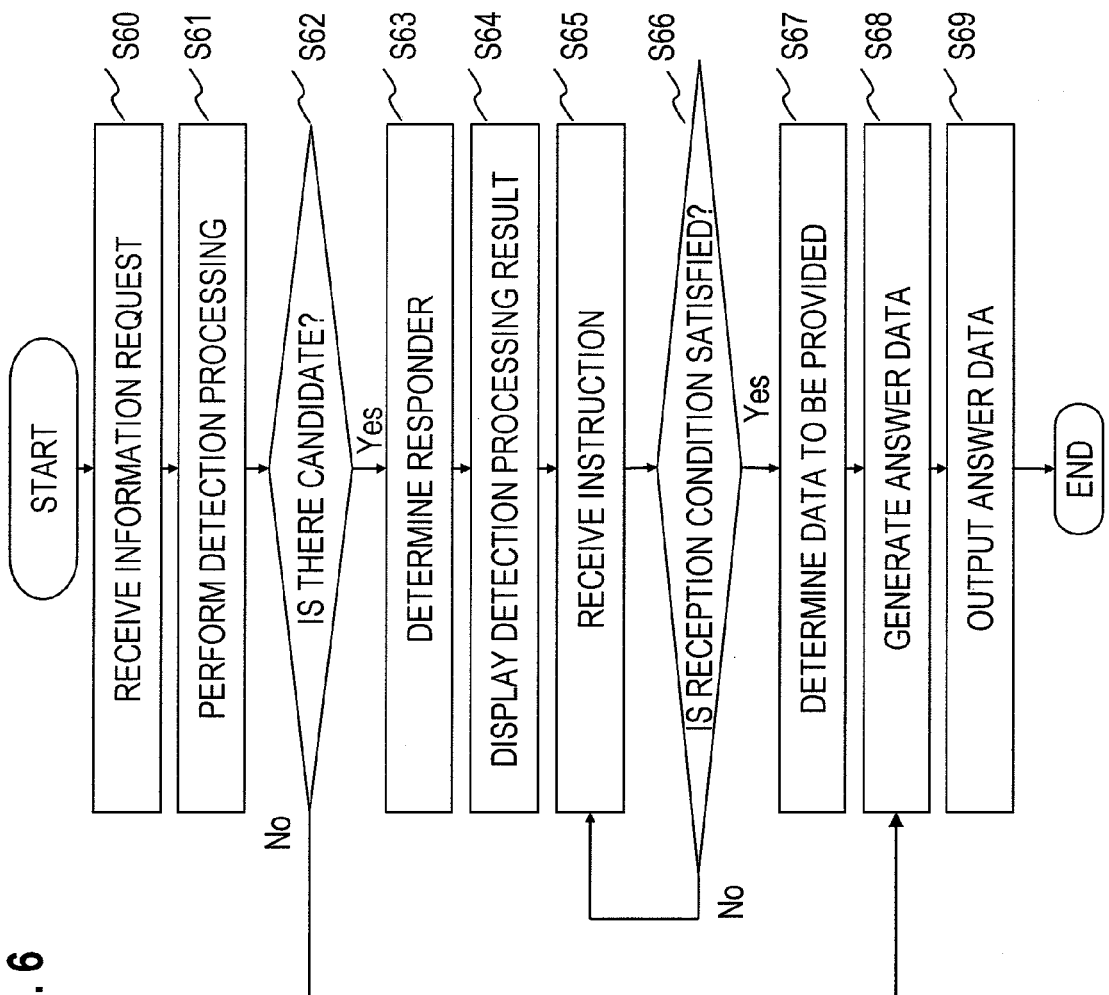
FIG. 6 is a flowchart showing the operation of the third exemplary embodiment of the present invention.

FIG. 6 is a flowchart showing the operation of the third exemplary embodiment of the present invention. The following describes the general operation of this exemplary embodiment in detail with reference to FIG. 5 and FIG. 6. In the description below, assume that information request data is entered from the requester terminal 510.

First, the receiving means 531 receives information request data from the requester terminal 510 via the network 590 and assigns request identification information to it as the data identifying the information request data (step S60 in FIG. 6). In addition, the receiving means 531 references the requester information storage unit 542 to recognize the requester information, creates the correspondence between the request identification information and the requester information, and transfers the request identification information, the requester information, and the information request data to the detection processing means 532.

Next, the detection processing means 532 receives the information request data from the receiving means 531 and analyzes the content of the information request data. After that, the detection processing means 532 extracts a set of related data by searching the data in the data storage unit 541 of the storage device 540 for data related to the analyzed result of the content of the information request data, extracts a set of provision candidate data, corresponding to the content of the information request data, from the set of related data as the detection processing result (step S61). The detection processing means 532 transfers the detection processing result, as well as the request identification information, requester information, and the content of the information request data, to the response control means 533. If the detection processing means 532 cannot extract provision candidate data and fails in the detection processing, the detection processing result indicates that there is no provision candidate data.

If it is determined that the detection processing result received from the detection processing means 532 does not include provision candidate data (No in step S62), the response control means 533 transfers data, which indicates that there is no data to be provided, to the answer generating means 534. The answer generating means 534 creates answer data from the received data (step S68).

If it is determined that the detection processing result includes provision candidate data (Yes in step S62), the response control means 533 determines the responder of the provision candidate data from the detection processing result. The response control means 533 references the provision candidate data and the responder information storage unit 543 to identify the responder information corresponding to each provision candidate data. The response control means 533 creates display data, composed of the content of the information request data and the provision candidate data, for each piece of responder information and transfers the created display data to the responder terminal 520 corresponding to the responder information (step S63).

The responder terminal 520 receives the display data, composed of the content of the information request data and the provision candidate data, from the response control means 533 via the network 590 and outputs the received display data (step S64).

After that, the responder terminal 520 receives the input of instruction information which is entered by the responder in response to the display data to indicate whether or not the provision candidate data of the detection processing result is to be provided. After that, the responder terminal 520 transfers the received instruction information to the response control means 533 via the network 590 (step S65).

The response control means 533, which receives the instruction information from the responder terminal 520, determines whether the instruction information satisfies a predetermined condition. If the condition is not satisfied (No in step S66), control is given back to step S65 to wait for the rest of the instruction information. The condition is, for example, whether the number of pieces of the acquired instruction information has reached a predetermined number or the time has reached a predetermined time but is not limited to the method described in this exemplary embodiment. If the predetermined condition is satisfied and the instruction information is received after step S66, the instruction information is given to the response control means 533 to generate additional answer data or to discard the instruction information.

The response control means 533, which has determined in step S66 that the condition is satisfied, determines whether there is providable data based on the acquired instruction information and the detection processing result, and supplies the providable data, as well as the request identification information, responder information, and the content of the information request data, to the answer generating means 534 (step S67).

Next, the answer generating means 534 generates answer data from the data received from the response control means 533, identifies the requester terminal 510 indicated by the requester information corresponding to the request identification information, and sends the answer data to the requester terminal 510 via the network 590 as the response to the information request data (step S68).

Finally, the requester terminal 510, which has received the answer data, outputs the received answer data (step S69).

This exemplary embodiment has been described as an example of the application of the first exemplary embodiment in which, in addition to the data processing device and the storage device of the first exemplary embodiment in FIG. 1, multiple requester terminals and multiple responder terminals are connected to the data processing device via the network. Alternatively, this exemplary embodiment may further comprise a result storage unit in the same way as in the second exemplary embodiment shown in FIG. 3. In this case, the detection processing result is saved in a result storage unit similar to the result storage unit 342 shown in the second exemplary embodiment in FIG. 3 and, in response to a display request entered by a responder, the operation similar to that in step S64 is performed for each responder.

In addition, a flag indicating whether data is public data may be set in advance in the attribute information related to each piece of data stored in the data storage unit 541. In this case, after the detection processing result is acquired, data whose flag indicates that the data is public, as well as provision candidate data, is given to the answer generating means 534 as providable data without performing the processing in step S63 to step S66.

This exemplary embodiment may further comprise means that, after instruction information is accepted from the responders, gives points to each piece of responder information according to the number of times instruction information is accepted or the number of pieces of providable data. By doing so, the system is expected to bring about such effects as to prompt more and more responders to participate in the system and to encourage responders to provide information.

Next, the following describes the effect of the third exemplary embodiment of the present invention.

The information providing system in this exemplary embodiment identifies the responder of each provision candidate data of a detection processing result extracted in response to an information request from a requester, provides provision candidate data, as well as the content of the information request, to each responder, determines whether there is providable data based on accepted instruction information, and creates answer data, thus allowing instructions to be accepted from multiple responders. This configuration allows many responders to provide information while maintaining security without decreasing efficiency.

Figure 7:
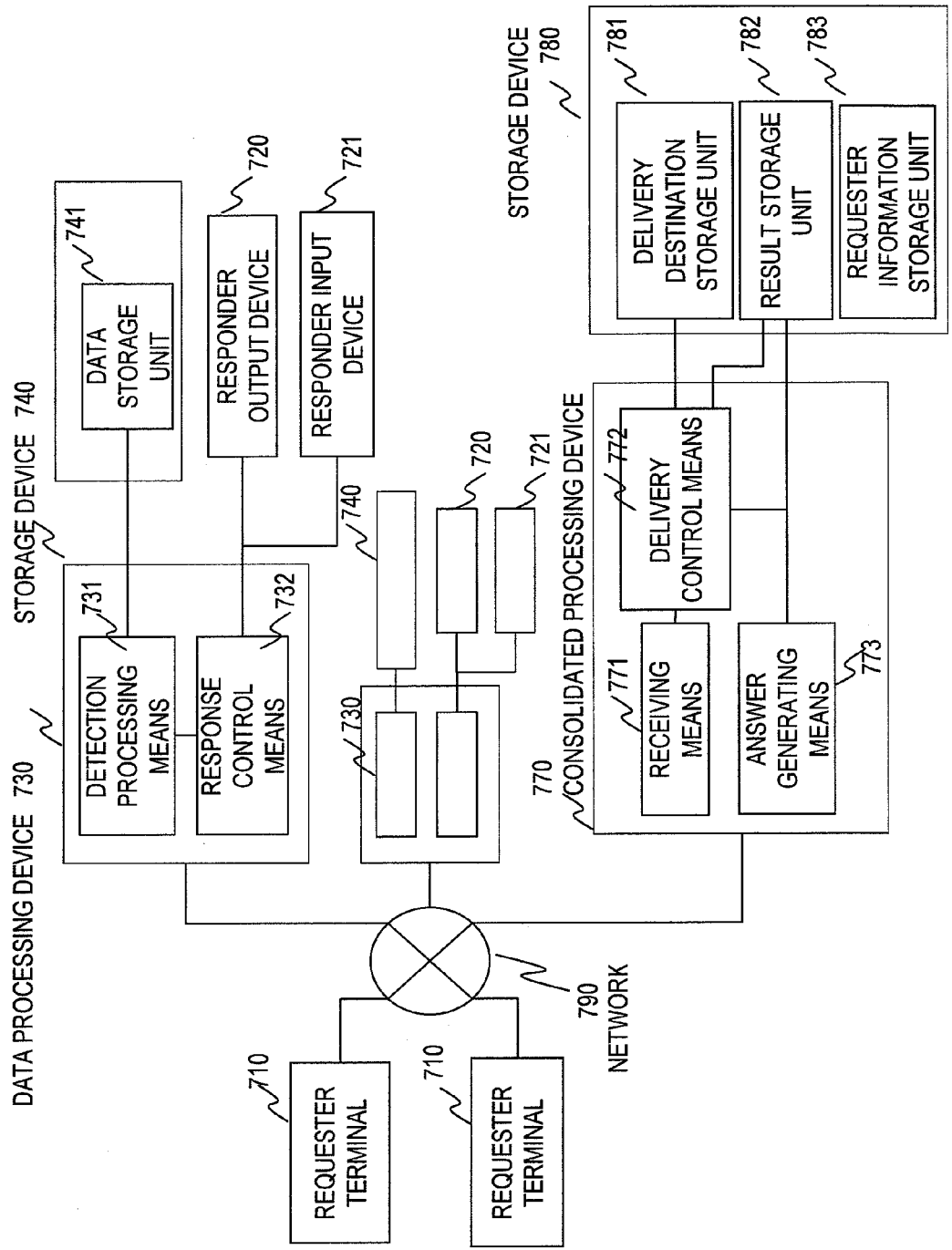
FIG. 7 is a block diagram showing the configuration of a fourth exemplary embodiment of the present invention.

Next, a fourth exemplary embodiment of the present invention will be described in detail with reference to the drawings. FIG. 7 is a diagram showing the configuration of the fourth exemplary embodiment of the present invention. In addition to the data processing device and the storage device in the first exemplary embodiment shown in FIG. 1, the fourth exemplary embodiment of the present invention further comprises multiple data processing devices, multiple storage devices, and a consolidated processing device.

Referring to FIG. 7, the fourth exemplary embodiment of the present invention comprises multiple requester terminals 710 each of which is a terminal device that receives the input of a request from a requester and outputs information that is provided, multiple responder output devices 720 each of which outputs information to a responder, multiple responder input devices 721 each of which receives an input from a responder, multiple data processing devices 730 each of which operates under program control, multiple storage devices 740 each of which stores data, a consolidated processing device 770, a storage device 780 connected to the consolidated processing device 770, and a network 790.

The requester terminal 710, responder output device 720, and responder input device 721 have the same configuration as that of the corresponding devices in the first exemplary embodiment of the present invention shown in FIG. 1. The responder output device 720 and the responder input device 721 may be connected to the data processing device 730 via the network 790.

The data processing device 730 comprises detection processing means 731, response control means 732, and communication means not shown.

The storage device 740 comprises a data storage unit 741 that stores data to be provided as information. The data storage unit 741 stores stored data and related responder information that is information identifying a responder.

The consolidated processing device 770 comprises receiving means 771, delivery control means 772, answer generating means 773, and communication means not shown.

The storage device 780 comprises a delivery destination storage unit 781 that stores delivery information identifying each of multiple data processing devices 730, a result storage unit 782 that stores the processing result of each data processing device 730, and a requester information storage unit 783.

The requester information storage unit 783 stores requester information, which identifies requesters, and related communication information on requester terminals.

The general operation of those means is as follows.

The receiving means 771 of the consolidated processing device 770 receives information request data sent from the requester terminal 710 via the network 790 and received via the communication means not shown. When the information request data is accepted, the receiving means 771 assigns request identification information to the received information request data as the data to identify it, references the requester information storage unit 783 to identify the requester, and establishes the correspondence between the request identification information and the requester information.

The delivery control means 772 of the consolidated processing device 770 checks the delivery information, stored in the delivery destination storage unit 781 of the storage device 780, to identify multiple data processing devices 730 to which data is to be delivered. The delivery control means 772 delivers the request identification information and the information request data to the multiple identified data processing devices 730 as a detection processing request via the communication means (not shown) and the network 790.

The detection processing means 731 of the data processing device 730 receives the detection processing request sent from the consolidated processing device 770 via the network 790.

The detection processing means 731 analyzes the content of the information request data and searches the data stored in the data storage unit 741 of the storage device 740 for a set of data related to the content of the information request data. From the set of data, the detection processing means 731 extracts a set of provision candidate data, which is data corresponding to the information request data and is a candidate for an answer to be provided to the requester, and combines it with the attribute information, which includes the responder information related to each piece of data in the set of the provision candidate data, to create a detection processing result. After that, the detection processing means 731 sends the detection processing result, as well as the request identification information, to the delivery control means 772 of the consolidated processing device 770 via the communication means (not shown) and the network 790. If the detection processing means 731 does not extract provision candidate data and fails in the detection processing, the detection processing result indicates that there is no provision candidate data.

Next, the delivery control means 772 of the consolidated processing device 770 receives the detection processing result created in response to the detection processing request, checks the detection processing result to determine whether there is the data processing device 730 that is a sending destination to which a providable data request is to be sent wherein the providable data request is a request for providable data. If there is such a sending destination, the delivery control means 772 sends the detection processing result, as well as the request identification information and the requester information, to the data processing device 730, which is determined as the sending destination, as a providable data request via the communication means (not shown) and the network 790.

If it is determined there is no such sending destination, the delivery control means 772 sends data, which indicates that there is no data to be provided, to the answer generating means 773.

The response control means 732 of the data processing device 730, which receives the providable data request, checks the detection processing result to determine the requester for each provision candidate data, creates display data, composed of the content of the information request data, requester information, and provision candidate data, for the corresponding responder, and outputs the created display data to the responder output device 720.

The responder input device 721 receives the input of instruction information, which indicates whether or not the provision candidate data produced as the result of the detection processing is to be provided, from the responder. The responder input device 721 transfers the received instruction information to the response control means 732.

The response control means 732 checks the providable data if it is data to be provided, based on the instruction information received from the responder input device 721 and the detection processing result, and sends the data to be provided, as well as the request identification information, to the consolidated processing device 770.

The consolidated processing device 770 receives the data to be provided and transfers it to the delivery control means 772. The delivery control means 772 collects data to be provided for the request identification information and transfers the collected data to the answer generating means 773.

The answer generating means 773 generates answer data as a response to the information request data based on the data from the response control means 732, which is given from the delivery control means 772, and sends the generated answer data to the requester terminal 710, indicated by the requester information corresponding to the request identification information on the information request data, via the communication means (not shown) and the network 790.

The requester terminal 710 outputs the answer data received from the consolidated processing device 770.

Figure 8:
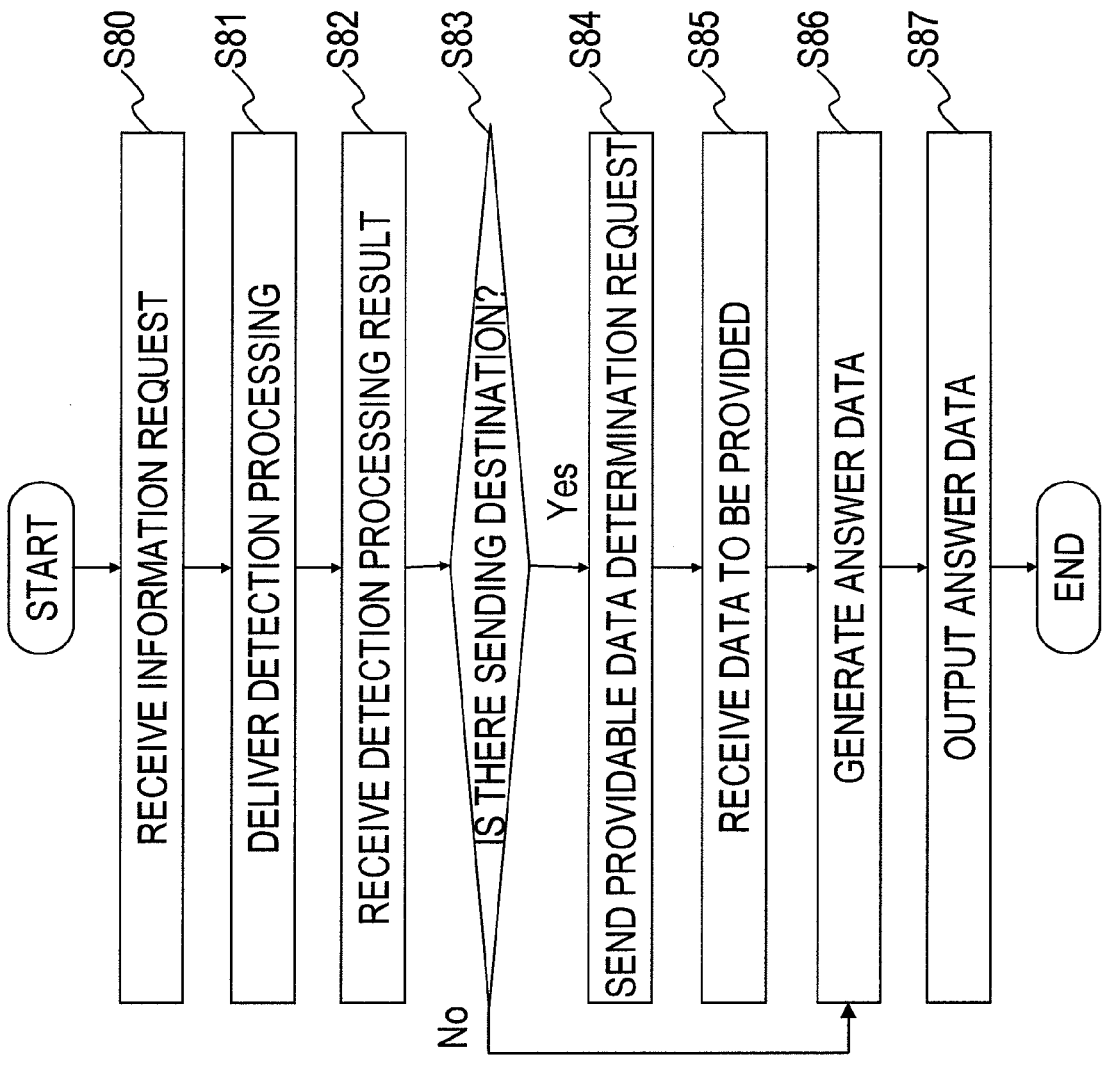
FIG. 8 is a flowchart showing the operation of the fourth exemplary embodiment of the present invention.
Figure 9:
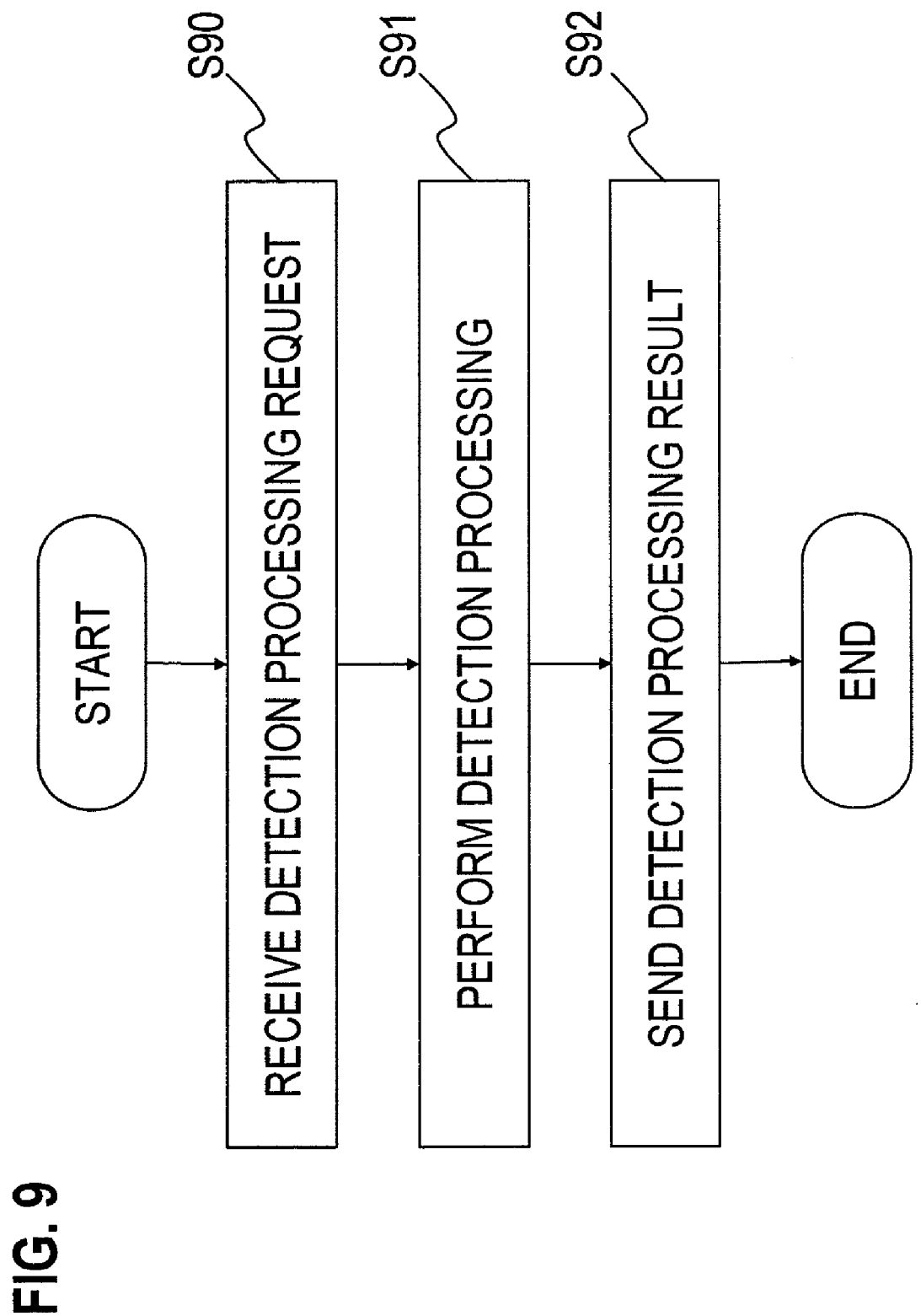
FIG. 9 is a flowchart showing the operation of the fourth exemplary embodiment of the present invention.
Figure 10:
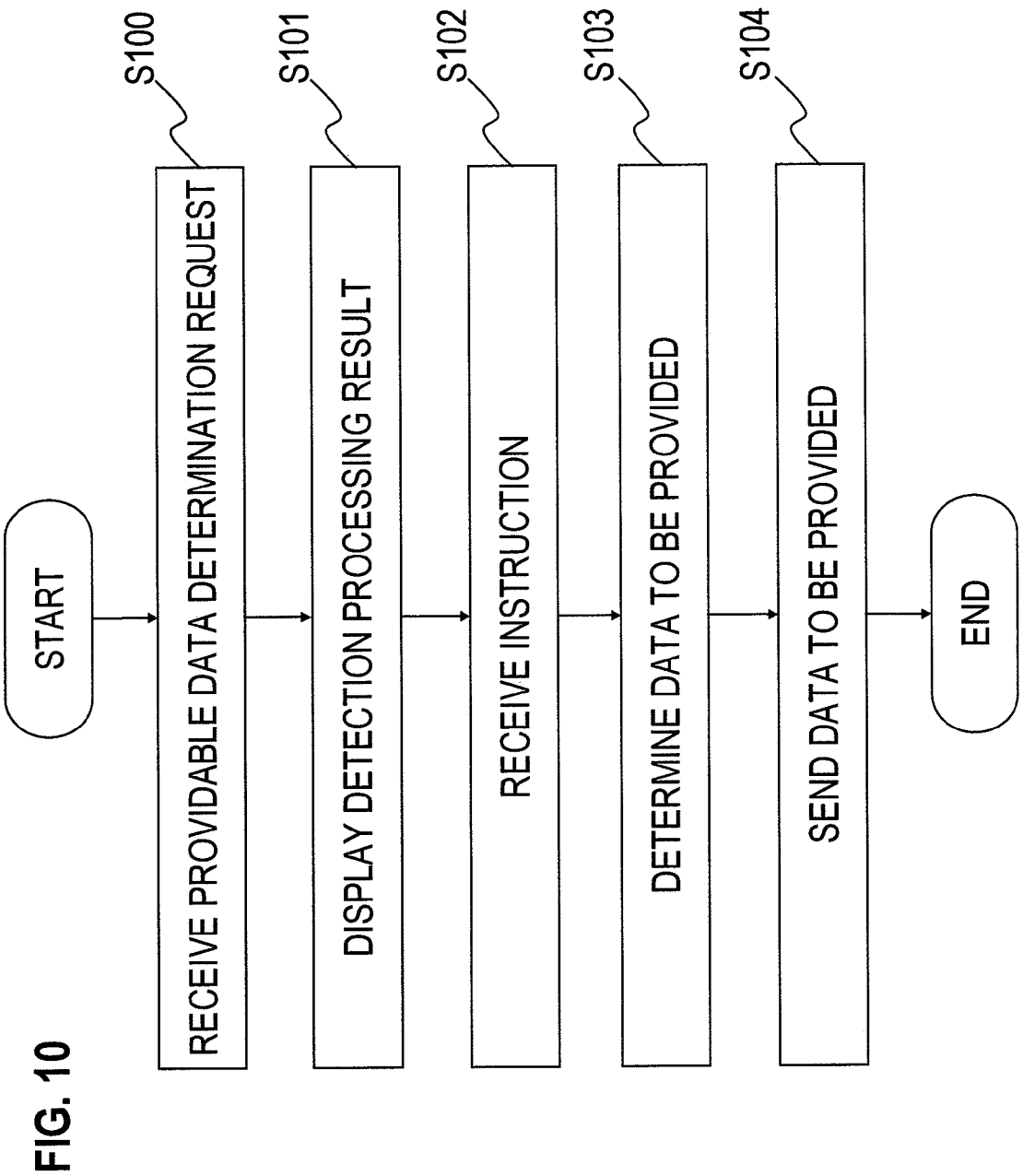
FIG. 10 is a flowchart showing the operation of the fourth exemplary embodiment of the present invention.

FIG. 8, FIG. 9, and FIG. 10 are flowcharts showing the operation of the fourth exemplary embodiment of the present invention. The following describes the general operation of this exemplary embodiment in detail with reference to FIG. 7 to FIG. 10.

First, the receiving means 771 of the consolidated processing device 770 receives an input, entered from the requester terminal 710, as information request data via the network 790 and the communication means (not shown) (step S80 in FIG. 8). When the information request data is accepted, the receiving means 771 assigns request identification information to the received information request data as information identifying the information request data, identifies requester information, and establishes the correspondence between them.

Next, the delivery control means 772 of the consolidated processing device 770 receives the information request data, request identification information, and requester information from the receiving means 771 and references the delivery information, stored in the delivery destination storage unit 781 of the storage device 780, to identify multiple data processing devices 730 to which a detection processing request is to be delivered. The delivery control means 772 delivers the request identification information and the information request data to the multiple identified data processing devices 730 as a detection processing request via the communication means (not shown) and the network 790 (step S81).

The detection processing means 731 of each data processing device 730 receives the detection processing request, sent from the consolidated processing device 770, via the communication means and the network 790 (step S90 in FIG. 9).

The detection processing means 731 analyzes the content of the information request data and searches the data in the data storage unit 741 of the storage device 740 for a set of data related to the content of the information request data. From the set of data that has been searched for, the detection processing means 731 extracts a set of provision candidate data, which is data corresponding to the information request data and is a candidate for an answer to be provided to the requester, and combines it with the attribute information, which includes the responder information related to each piece of data in the set of the provision candidate data, to create a detection processing result. If the data storage unit 741 does not store related data as a result of the detection processing, the detection processing result indicates that there is no related data (step S91 in FIG. 9).

The detection processing means 731 sends the detection processing result, as well as the request identification information, to the delivery control means 772 of the consolidated processing device 770 via the communication means (not shown) and the network 790 (step S92 in FIG. 9).

Next, the delivery control means 772 of the consolidated processing device 770 waits for the detection processing result of the detection processing request delivered to each of the multiple data processing devices and receives the detection processing results (step S82 in FIG. 8).

When the response is obtained, the delivery control means 772 checks the received detection processing result to determine whether or not there is the data processing device 730 that satisfies a predetermined condition (that is, if there is a sending destination) (step S83 in FIG. 8).

The predetermined condition is, for example, whether the number of detection processing results has reached a predetermined number or the time has reached a predetermined time.

Alternatively, a score, which increases as the matching degree of provision candidate data increases, is calculated and included in the detection processing result when the detection processing is performed, and whether the score has reached a predetermined score or whether the score is one of the highest scores may be used as the determination criterion. Note that the determination method is not limited to those methods.

If there is the data processing device 730 that satisfies the condition (Yes in step S83 in FIG. 8), this data processing device 730 is the sending destination data processing device 730 to which a providable data determination request is sent to request it to determine if there is providable data.

If it is determined that there is at least one data processing device 730 that satisfies the condition, the data processing device 730 is the sending destination. The delivery control means 772 sends the detection processing result, as well as the request identification information and the requester information, to the response control means 732 of the sending destination data processing device 730 as a providable data determination request via the communication means (not shown) and the network 790 (step S83 and step S84 in FIG. 8).

If it is determined that there is no such data processing device 730 that satisfies the condition (No in step S83 in FIG. 8), the delivery control means 772 transfers data, which indicates that there is no data to be provided, to the answer generating means 773.

The response control means 732 of the data processing device 730 receives the providable data determination request (step S100 in FIG. 10).

The response control means 732 checks the detection processing result to determine a responder for each provision candidate data, creates display data, composed of the content of the information request data, requester information, and provision candidate data, for the responder, and outputs the created display data to the responder output device 720 (step S101).

From the responder, the responder input device 721 receives the input of instruction information indicating whether or not the provision candidate data, which was obtained as the detection processing result, is to be provided (step S102). The responder input device 721 transfers the received instruction information to the response control means 732.

The response control means 732 determines providable data, based on the instruction information received from the responder input device 721 and the detection processing result, to find data to be provided and sends the data, as well as the request identification information, to the delivery control means 772 of the consolidated processing device 770 (step S103 and step S104).

The delivery control means 772 of the consolidated processing device 770 receives the data to be provided, via the network 790 and the communication means (not shown), and continues the processing until a predetermined condition is satisfied.

The predetermined condition is, for example, whether the number of pieces of the acquired data to be provided has reached a predetermined number or the time has reached a predetermined time. Note that the predetermined condition is not limited to the method described in this exemplary embodiment. If the predetermined condition is satisfied, the delivery control means 772 collects the data to be provided that corresponds to the request identification information and transfers the collected data to the answer generating means 773 (step S85).

The answer generating means 773 generates answer data as a response to the information request data based on the data from the response control means 732 which is given from the delivery control means 772 (step S86). After generating the answer data, the answer generating means 773 sends the generated answer data to the requester terminal 710, indicated by the requester information corresponding to the request identification information on the information request data, via the communication means (not shown) and the network 790.

The requester terminal 710 outputs the answer data, received from the consolidated processing device 770 via the network 790, as a response to the information request data (step S87).

Figure 11:
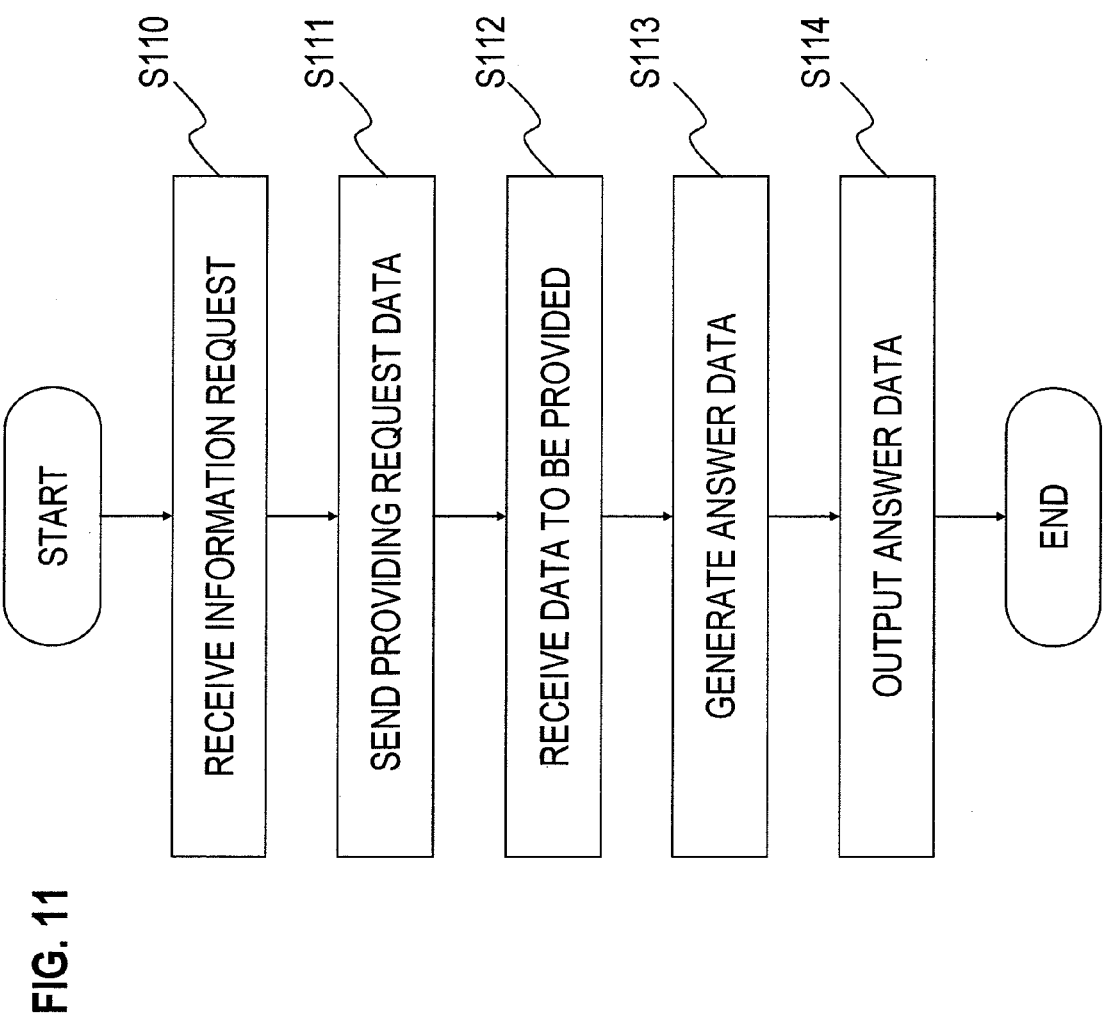
FIG. 11 is a flowchart showing another operation of the fourth exemplary embodiment of the present invention.
Figure 12:
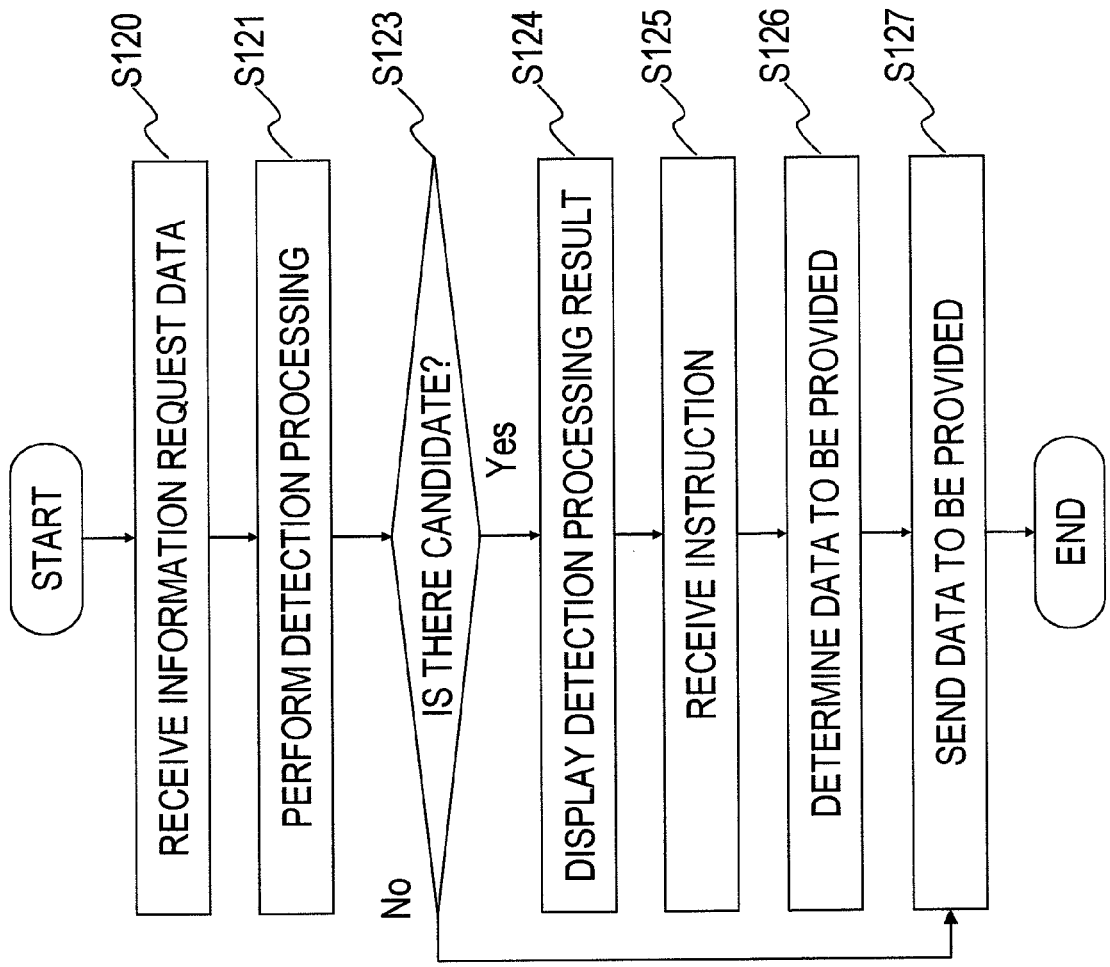
FIG. 12 is a flowchart showing another operation of the fourth exemplary embodiment of the present invention.

FIG. 11 and FIG. 12 are flowcharts showing another operation of the fourth exemplary embodiment. The following describes the general operation of this exemplary embodiment in detail with reference to FIG. 7 to FIG. 11 and FIG. 12.

First, the receiving means 771 of the consolidated processing device 770 receives an input, entered from the requester terminal 710, as information request data via the communication means (not shown) and the network 790 (step S110 in FIG. 11). When the information request data is accepted, the receiving means 771 assigns request identification information to the received information request data as the information to identify the information request data, identifies requester information, and establishes the correspondence between the request identification information and the requester information.

Next, the delivery control means 772 of the consolidated processing device 770 receives the information request data, request identification information, and requester information from the receiving means 771 and checks the delivery information, stored in the delivery destination storage unit 781 of the storage device 780, to identify multiple data processing devices 730 to which data is to be delivered.

The delivery control means 772 delivers the request identification information and the information request data to the multiple identified data processing devices 730 via the communication means (not shown) and the network 790 (step S111).

The detection processing means 731 of each data processing device 730 receives the detection processing request sent from the consolidated processing device 770 via the network 790 and the communication means (not shown) (step S120 in FIG. 12).

The detection processing means 731 analyzes the content of the information request data and searches the data in the data storage unit 741 of the storage device 740 for a set of data related to the content of the information request data. From the set of data that has been searched for, the detection processing means 731 extracts a set of provision candidate data, which is data corresponding to the information request data and is a candidate for an answer to be provided to the requester, and combines it with the attribute information, which includes the responder information related to each piece of provision candidate data, to create a detection processing result. If there is no related data in the data storage unit 741, the detection processing result indicates that there is no related data (step S121 in FIG. 12).

After that, the detection processing means 731 transfers the detection processing result, as well as the content of the information request data, to the response control means 732.

The response control means 732 determines the detection processing result, received from the detection processing means 731, if there is provision candidate data (step S123 in FIG. 12).

To determine if there is provision candidate data in step S123, the number of pieces of provision candidate data, produced as the result of the detection processing, is checked to see if it has reached a predetermined number. Alternatively, a score, which increases as the matching degree of provision candidate data increases, is calculated and included in the detection processing result when the detection processing is performed, and whether the score has reached a predetermined score or whether the score is one of the highest scores may be used as the determination criterion. Note that the determination method is not limited to those methods.

If it is determined that the detection processing result does not include provision candidate data (No in step S123 in FIG. 12), the response control means 732 sends data, which indicates that there is no data to be provided, as well as the request identification information, to the delivery control means 772 of the consolidated processing device 770 (step S127).

If it is determined that the detection processing result includes provision candidate data (Yes in step S123 in FIG. 12), the response control means 732 supplies the provision candidate data, as well as the content of the information request data, to the responder output device 720.

The responder output device 720 displays the detection processing result and the content of the information request data received from the response control means 732 (step S124).

After the detection processing result and the content of the information request data are displayed on the responder output device 720, the responder input device 721 receives the input of instruction information, which indicates whether or not the provision candidate data produced as the result of the detection processing is to be provided, from the responder and transfers the received instruction information to the response control means 732 (step S125).

The response control means 732 that receives the instruction information from the responder input device 721 determines the providable data based on the instruction information and the detection processing result and sends the providable data, as well as the request identification information, to the delivery control means 772 of the consolidated processing device 770 via the communication means (not shown) and the network 790 (step S126 and step S127).

The delivery control means 772 of the consolidated processing device 770 receives the data to be provided which is sent via the network 790 and the communication means (not shown). Because the remaining, subsequent steps S112-S114 in FIG. 11 correspond to, and are the same as, S85-S87 in FIG. 8, the description is omitted.

Next, the following describes the effect of the fourth exemplary embodiment of the present invention.

The information providing system in this exemplary embodiment, in which multiple data processing devices and storage devices are connected to the network, comprises a consolidated processing device that receives inquiry request data from requester terminals as a request, delivers a processing request to each data processing device, receives instruction information according to the extracted result, determines if the data is providable, and generates answer data, thus efficiently providing appropriate information from multiple storage devices while maintaining security.

Figure 13:
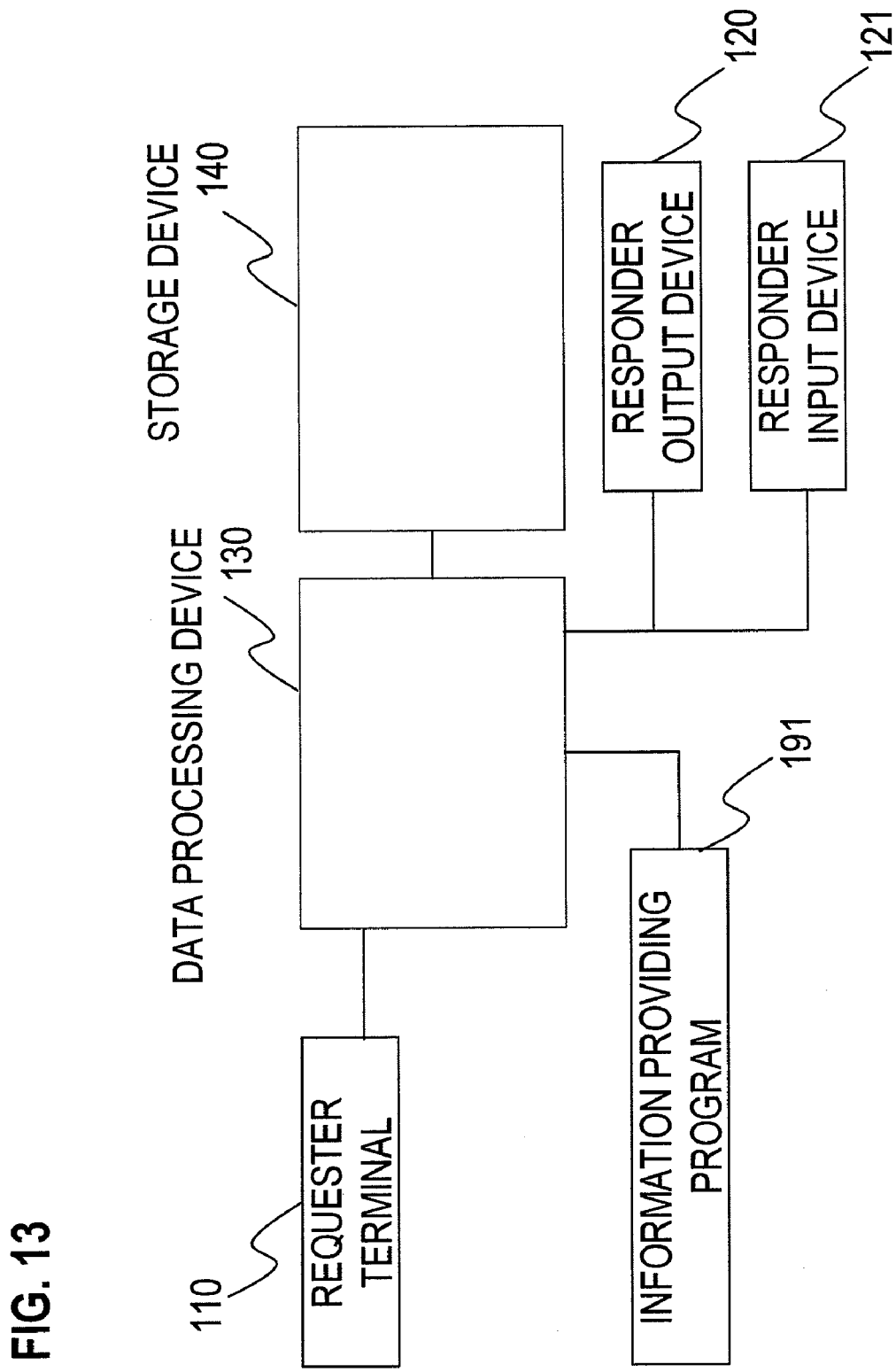
FIG. 13 is a block diagram showing the configuration of a fifth exemplary embodiment of the present invention.

Next, a fifth exemplary embodiment of the present invention will be described in detail with reference to the drawings. FIG. 13 is a diagram showing the configuration of the fifth exemplary embodiment of the present invention. Referring to FIG. 13, the fifth exemplary embodiment of the present invention comprises a requester terminal, a responder, a data processing device, and a storage device as with the first exemplary embodiment and the second exemplary embodiment of the present invention described above.

An information providing program 191 is read into a data processing device 130 for controlling the operation of the data processing device 130 and accesses a storage device 140. Under control of the information providing program 191, the data processing device 130 performs the same processing as that of the data processing device 130 in the first exemplary embodiment and the second exemplary embodiment of the present invention.

Figure 14:
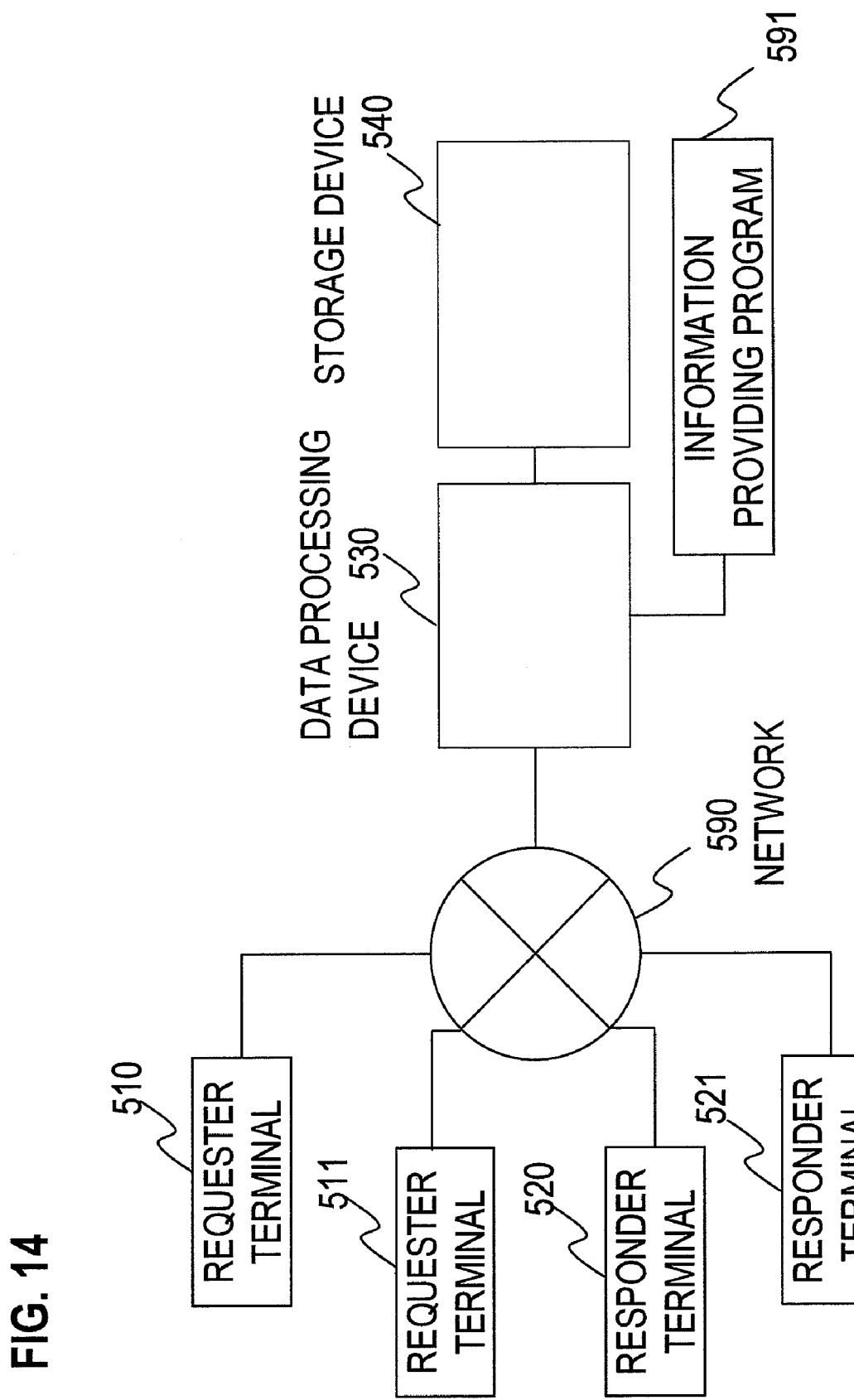
FIG. 14 is a block diagram showing the configuration of a sixth exemplary embodiment of the present invention.

Next, a sixth exemplary embodiment of the present invention will be described in detail with reference to the drawings. FIG. 14 is a diagram showing the configuration of the sixth exemplary embodiment of the present invention. Referring to FIG. 14, the sixth exemplary embodiment of the present invention comprises multiple requester terminals, multiple responder terminals, a data processing device, and a storage device as with the third exemplary embodiment of the present invention, and is configured in such a way that the multiple requester terminals and the multiple responder terminals are connected to the data processing device via a network.

An information providing program 591 is read into a data processing device 530 for controlling the operation of the data processing device 530 and accesses a storage device 540. Under control of the information providing program 591, the data processing device 530 performs the same processing as that of the data processing device 530 in the third exemplary embodiment of the present invention.

Figure 15:
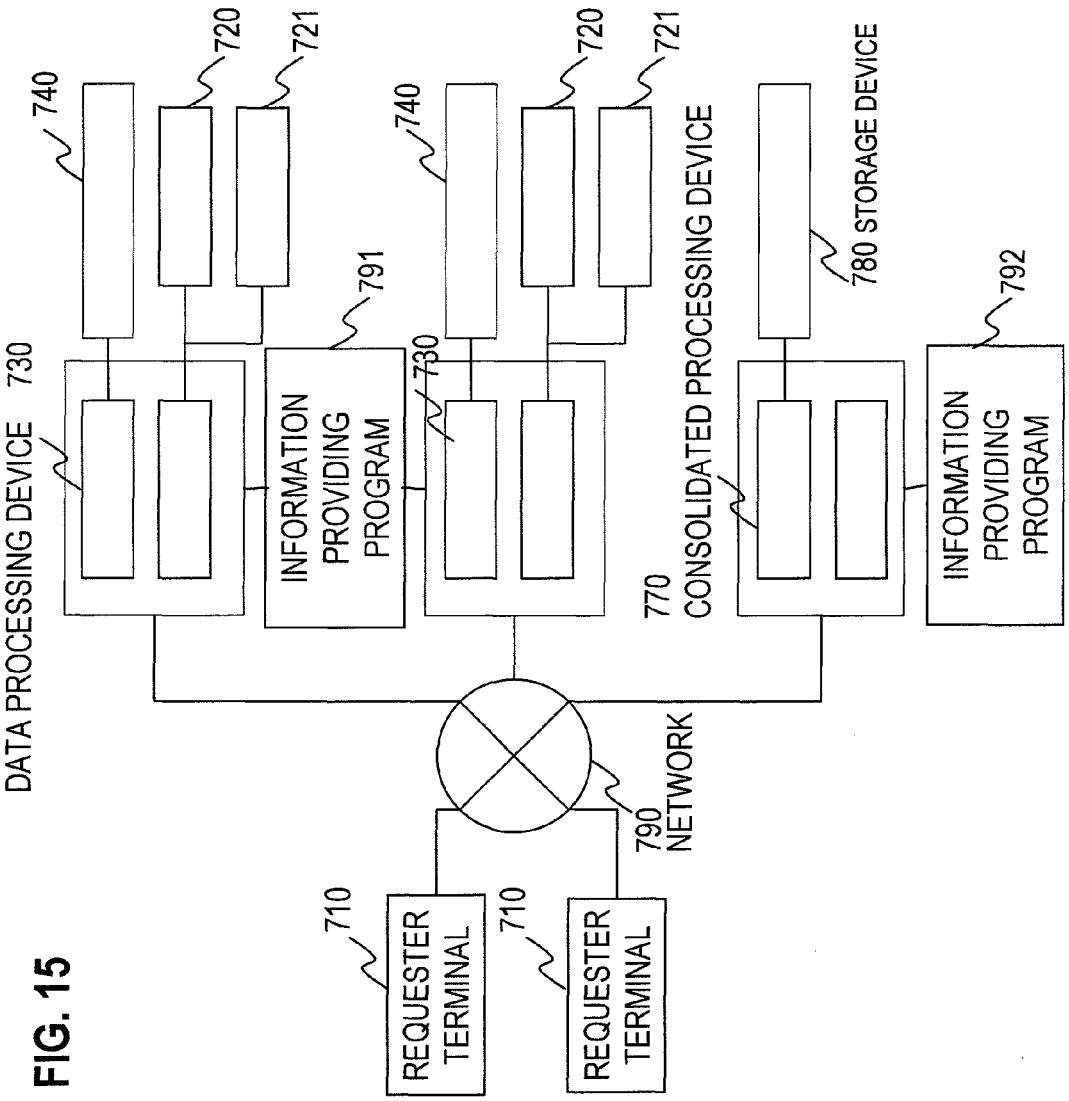
FIG. 15 is a block diagram showing the configuration of a seventh exemplary embodiment of the present invention.

Next, a seventh exemplary embodiment of the present invention will be described in detail with reference to the drawings. FIG. 15 is a diagram showing the configuration of the seventh exemplary embodiment of the present invention. Referring to FIG. 15, the seventh exemplary embodiment of the present invention comprises multiple requester terminals, multiple responder input devices and responder output devices, and multiple data processing devices 730 and storage devices 740 as with the fourth exemplary embodiment of the present invention described above, and is configured in such a way that multiple requester terminals 710 are connected to a consolidated processing device 770 via a network 790.

The consolidated processing device 770 is connected to the multiple data processing devices 730 via the network 790.

Referring to FIG. 15, an information providing program 791 is read into the data processing device 730 for controlling the operation of the data processing device 730 and accesses the storage device 740.

Under control of the information providing program 791, the data processing device 730 performs the same processing as that of the data processing device 730 in the fourth exemplary embodiment of the present invention.

An information providing program 792 is read into the consolidated processing device 770 for controlling the operation of the consolidated processing device 770 and accesses a storage device 780. Under control of the information providing program 792, the consolidated processing device 770 performs the same processing as that of the consolidated processing device 770 in the fourth exemplary embodiment of the present invention described above.

The following describes examples.

Example

This example corresponds to the first exemplary embodiment of the present invention described above. This example comprises a display as the responder output device, a keyboard or a mouse as the responder input device, a personal computer as the data processing device, and a magnetic disk storage device or a database device as the storage device. The storage device may be combined with the data processing device. This example further comprises a keyboard as the requester terminal from which a requester enters data and a personal computer or a mobile phone with a display to which data to the requester is output.

The personal computer has a central processing unit (not shown) that functions as the receiving means (131 in FIG. 1), detection processing means (132 in FIG. 1), response control means (133 in FIG. 1), and answer generating means (134 in FIG. 1), and the magnetic disk storage device (140 in FIG. 1) stores data to be provided as information. The stored data is stored in advance by means of the personal computer. The data need not be created specifically for the information providing system but may be stored by a personal computer user (who will act as a responder later) for other purposes. Only the user of this computer may access the storage device.

As shown in FIG. 16, the data storage unit of the storage device stores a data ID, which is information identifying data, and the content of the corresponding data itself. Although text information composed of one or more sentences is stored corresponding to a data ID in the example shown in FIG. 16, the data is of course not limited to text. In addition to text information, the data may be image information, moving-data information, and audio information to which metadata is attached. The data may be in any information unit, and may be stored in a file that is one of information units.

The following describes the operation of this example.

Assume that a query "What is the concept of Tanaka's project?" is entered from the requester terminal (110 in FIG. 1) as information request data.

The central processing unit (not shown), which functions as the receiving means (131 in FIG. 1), receives the inquiry, which was entered from the requester terminal, as information request data.

Next, the central processing unit (not shown) analyzes the inquiry of the information request data and checks the data storage unit (141 in FIG. 1) of the storage device (140 in FIG. 1) to detect provision candidate data (hereinafter termed "answer candidate") that is a candidate for the answer to the content of the inquiry.

Although not limited thereto, this example uses the morphological analysis to analyze the inquiry of information request data for extracting the content words such as nouns, verbs, and adjectives from morphemes, removes unwanted words that will become the causes of noises of the detection result, and extracts search information as one or more search keywords.

During the detection processing, answer candidates to the inquiry are extracted from this. For example, the search information is used to search the data storage unit to generate a set of search result related data as the answer candidates. If there are multiple keywords, the set may be narrowed down to a set that includes all keywords.

It is also possible to add weights during the search, to give scores to the search result according to the matching degree, and to narrow down the answer candidates using the scores. To calculate scores, any known technologies such as the TF/IDF (Term Frequency/Inverse Document Frequency) method may be used.

Although not limited thereto, answer candidates are extracted in this example based on the closeness of distance between search keywords in the data included in the set of search result related data produced as the result of the search using multiple search keywords. In this case, provision candidate data is extracted from the set of related data based on the determination of the distance between search keywords and the threshold.

Because the detection processing method used by the detection processing means (132 in FIG. 1) is not limited thereto, the detection processing means may be replaced by some other query/answer technology. Any technology that receives a query request as the input and extracts answer candidates may be used.

The query/answer technology is a technology for outputting an answer to a requester's query and a document corresponding to the answer from multiple pieces of document information. For example, refer to Patent Document 3 (Japanese Patent Publication Kokai JP-A No. 2002-132812).

When there are multiple answer candidates, a fixed number of candidates may be used as the detection processing result in descending order of matching degrees. In the description below, one candidate to be provided is output as the detection processing result.

Assume that, as the detection processing result, "The concept of Tanaka's project is a process improvement" is obtained from the data ID "D21" as the answer candidate for a sentence that includes important content words most.

Although a sentence is extracted as the answer candidate in this example, a known query/answer technology may also be used to extract an answer candidate with a higher matching degree as the detection processing result.

For example, because the query/answer technology outputs "process improvement" from the data ID "D21" as the answer candidate, this output may be used as the detection processing result.

The central processing unit (not shown) outputs the detection processing result of the detection processing means (132 in FIG. 1), as well as the inquiry, to the responder output device (120 in FIG. 1). At this output time, the related information, the method for giving an instruction that will be received as the input, and the input prompting information may be output with the answer candidate.

If an answer candidate is not detected during the detection processing of an answer candidate, the information indicating that there is no providable data is returned to the requester as the answer data.

Figure 17:
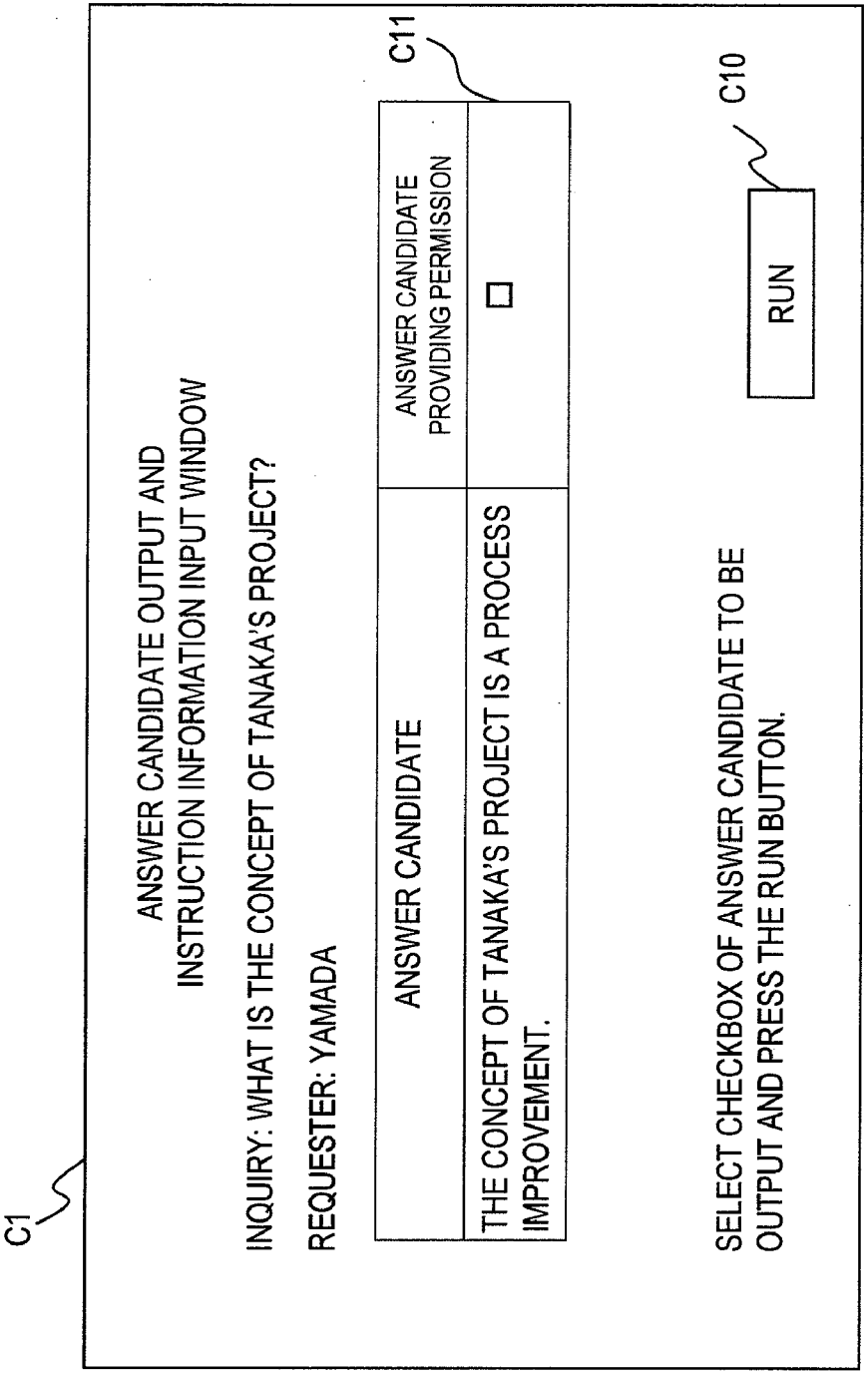
FIG. 17 is a diagram showing the first example of the present invention.

Referring to FIG. 17, the following are output on the responder output device (120 in FIG. 1).

On a window C1, the query and
the answer candidate
are displayed and
the instruction input method and
the requester's name
are also displayed.

In response to the window C1 displayed on the responder output device (120 in FIG. 1), the responder (not shown) uses the responder input device (121 in FIG. 1), such as a mouse, to select an answer candidate to be provided, turn on a checkbox C11, and press a Run button C10.

If there is no answer candidate the responder wants to provide, if the user wants to reject to provide information, or if an answer candidate was not searched for during the search for the answer candidate, the user need not select any answer candidate but is required only to press the Run button C10.

Assume that the checkbox C11 of the answer candidate indicated by "The concept of Tanaka's project is a process improvement" is selected and that the Run button is pressed.

After that, the central processing unit (not shown) receives the input from the responder input device (121 in FIG. 1) as the instruction information and, based on the instruction information, generate answer data. For example, only the answer candidate, selected by the checkbox C11, can be generated as the answer data.

Alternatively, the answer candidate may also be combined with a predetermined formatted sentence to generate answer data.

If no answer candidate is selected, the central processing unit (not shown) generates answer data that includes null information or error information. For example, a predetermined answer example is as follow.

[No Answer]

In the present invention, the answer data generation method is of course not limited to the one described above.

Next, the central processing unit (not shown) outputs the generated answer data to the requester terminal (110 in FIG. 1)) and displays the answer data, which corresponds to the request, on the requester terminal (110 in FIG. 1).

Next, a second example of the present invention will be described with reference to drawings. The second example corresponds to the first exemplary embodiment of the present invention.

The second example of the present invention is similar to the first example described above in the configuration but is different from the first example described above in the information that the central processing unit (not shown) of the computer device outputs when the detection processing result is output to the responder output device. That is, the information is different in that it further includes the information indicating whether or not data corresponding to the answer candidate is to be provided and the information indicating that any information on the query will be accepted and, in addition, is different in the content of the input instruction information that the central processing unit (not shown) receives from the responder input device.

Again, in this example, assume that a query "What is the concept of Tanaka's project?" is entered from the requester terminal (110 in FIG. 1) as information request data as in the first example described above.

As in the first example described above, the central processing unit (not shown) extracts multiple answer candidates corresponding to the query to produce the detection processing result.

The following description assumes that, unlike in the first example described above, multiple answer candidates are obtained as the detection processing result.

The central processing unit (not shown) outputs the detection processing result of the detection processing means (132 in FIG. 1), as well as the query, to the responder output device (120 in FIG. 1).

Referring to FIG. 18, the following are output to the responder output device (120 in FIG. 1).

On a window C2, the query
the multiple answer candidates and
the data IDs corresponding to the answer candidates
are displayed.
In addition, on the window C2,
a checkbox C21 used to instruct whether or not each answer candidate is to be provided and
a checkbox C22 used to instruct whether or not the data indicated by each data ID is to be provided and
a comment input field C23 in which the responder enters any information
are included and
the instruction input method and
the requester's name
are also displayed.

If attribute information other than the data ID is related to the data in the storage device and stored therein, that information may also be displayed.

In response to the window C2 displayed on the responder output device (120 in FIG. 1), the responder uses the responder input device (121 in FIG. 1) to select an answer candidate to be provided to turn on the corresponding checkbox C21, turns on the checkbox C22 corresponding to the data to be provided if the responder wants to give a permission to provide the whole data indicated by the data ID, and enters text in the comment input field C23 if the responder wants to provide information such as a comment. After that, the responder presses a Run button C20.

If there is no answer candidate to be provided by the responder, if the responder rejects to provide information, or if there is no data to be provided, the responder may also use the responder input device (121 in FIG. 1) to press the Run button C20 without selecting anything. At this time, it is of course possible to output a message instructing the responder to enter only a comment as information to be provided.

Assume that
the checkbox C21 corresponding to "The concept of Tanaka's project is a process improvement", which is one of answer candidates shown in FIG. 18, is selected,
the checkbox C22 corresponding to the data ID "D21" is selected,
"Enclosed is the proposal material of the project" is entered in the comment input field C23 as a comment, and
the Run button C20 is pressed using the responder input device (121 in FIG. 1).

After that, the central processing unit (not shown) receives the input, entered from the responder input device (121 in FIG. 1), as the instruction information and generates answer data based on the instruction information.

The following are obtained as the instruction information.
Information indicating that the answer candidate "The concept of Tanaka's project is a process improvement" may be provided,
Information indicating that whole data of the data ID "D21" may be provided, and
Text information entered in the comment input field
The information given above can be combined to generate answer data.
The answer data is data including the following.
Information on answer candidates
Text information entered in the comment input field, and
Whole data of the data ID "D21"
In the present invention, the method for generating answer data is of course not limited to the one described above.

Next, the central processing unit (not shown) outputs the generated answer data to the requester terminal (110 in FIG. 1), and the answer data corresponding to the request is displayed on the requester terminal (110 in FIG. 1).

The present invention is applicable to a consolidated processing device that provides information from a computer, which includes data not accessible to a user who wants the information, in response to a query and to a program that implements the consolidated processing device in a computer.

The information providing function is applicable also to the uses such as an information search system, a document management system, a storage system, a query/answer system, and a knowledge management (KM) system.

The disclosures of the Patent Documents described above are hereby incorporated by reference into this specification. The exemplary embodiments and examples may be changed and adjusted within the scope of the disclosures (including claims) of the present invention and based on the basic technical concept. In addition, various disclosed elements may be combined and selected in various ways within the scope of the claims of the present invention.

The invention claimed is:

1. An information providing system comprising:

a data processing device; and a data storage unit in which store data and responder information that identifies a responding person, are stored in correlated manner to each other, the data processing device comprising:

a detection processing unit that searches the data storage unit based on an information request received from a requester terminal, extracts provision candidate data, which is a candidate for an answer to be provided to a requester, in correspondence with the information request, from the data storage unit, and combines the provision candidate data with responder information correlated to each store data corresponding to the provision candidate data to produce a detection processing result; and a control unit that determines a responder for each store data in the detection processing result, creates display data, which includes a content of the information request and the provision candidate data, for each determined responder, receives information on permission or non-permission of information provision regarding the extracted provision candidate data from a responding person who confirmed the display data, creates answer data for the information request based on the information on permission or non-permission of information provision and the extracted provision candidate data, and controls sending of the created answer data to the requester terminal, the created answer data being supplied as information provision to the requester, wherein the information providing system comprises a plurality of sets of the data processing device and the data storage unit, the data processing device comprising:

a detection processing unit that analyzes a content of an information request from a requester, extracts provision candidate data from store data stored in the data storage unit, combines the provision candidate data, store data corresponding to the provision candidate data, and responder information related to each item of the store data, and outputs the combined information as a detection processing result; and a respondent control unit that receives the content of the information request and the detection processing result from the detection processing unit, determines a responder for each item of store data in the detection processing result, outputs display data, which includes the content of the information request, the provision candidate data, and store data corresponding to the provision candidate data, to a responder terminal for each determined responder, receives instruction information that is entered from the responder terminal and that indicates permission or non-permission on provision of the provision candidate data that is produced as the detection processing result, determines whether or not there is providable data based on the detection processing result and the instruction information, and outputs providable data based on a determination result, the information providing system further comprising an consolidated processing device that is connected to the plurality of data processing devices and a plurality of requester terminals via a network and that comprises a receiving unit, a delivery control unit, and an answer generating unit, wherein in the consolidated processing device, the delivery control unit delivers an information request from the requester terminal, which is accepted by the receiving unit, to one or more data processing devices, the delivery control unit receives providable data that is searched for by the detection processing unit of the data processing device and that is output from the respondent control unit of the data processing device, and the answer generating unit creates answer data from the providable data and sends the created answer data to the requester terminal via the network as a response to the information request, wherein, when providable data is received from the respondent control unit of the data processing device, the delivery control unit generates answer data if a number of items of providable data has reached a predetermined number or if a predetermined time has been reached, and sends the answer data to a requester terminal that corresponds to the requester information corresponding to the information request.

2. The information providing system according to claim 1, comprising a storage device connected to the consolidated processing device, the storage device including:

a delivery destination storage unit that stores delivery information identifying the plurality of data processing devices;

a result storage unit that stores processing results of the data processing devices; and a requester information storage unit that stores requester information, which is information identifying requesters, and related communication information on requester terminals, wherein in the consolidated processing device, the receiving unit receives an information request sent from the requester terminal via the network, assigns request identification information to the information request, identifies requester information by referencing the requester information storage unit, and establishes a correspondence between the request identification information and the requester information, the delivery control unit identifies a plurality of data processing devices, which are delivery destinations, from the delivery information stored in the delivery destination storage unit and delivers the request identification information and the information request to the identified data processing devices via the network as a detection processing request, the detection processing unit of the data processing device receives the detection processing request delivered from the consolidated processing device via the network, the detection processing unit of the data processing device searches the data storage unit for a set of data related to the content of the information request, extracts a set of provision candidate data corresponding to the information request, combines the extracted set of provision candidate data with attribute information that includes responder information related to data in the set of provision candidate data to create a detection processing result, and sends the detection processing result, as well as the request identification information, to the delivery control unit of the consolidated processing device, in the consolidated processing device, the delivery control unit receives a response that is the detection processing result for the detection processing request and, if the response is obtained, determines whether or not there is a data processing device that is a sending destination, to which a providable data request for requesting providable data is to be sent, according to the detection processing result, and if it is determined that there is a sending destination, sends the detection processing result, as well as the request identification information and the requester information, to the data processing device, which is determined to be the sending destination, via the network as the providable data request, the respondent control unit of the data processing device, which has received the providable data request from the delivery control unit of the consolidated processing device, determines a responder of each provision candidate data from the detection processing result, creates display data, which includes the content of the information request data, requester information, and provision candidate data, for the responder, and outputs the created display data to the responder terminal, the respondent control unit receives an input of instruction information on permission or non-permission on provision of the provision candidate data, produced as the detection processing result, from the responder terminal, determines providable data, based on the instruction information and the detection processing result, to produce providable data, and sends the providable data, as well as the request identification information, to the consolidated processing device, the consolidated processing device transfers the providable data, received from the respondent control unit of the data processing device, to the delivery control unit, the delivery control unit of the consolidated processing device collects providable data for the request identification information and transfers the collected providable data to the answer generating unit, and the answer generating unit generates answer data from the data, received from the respondent control unit, as a response to the information request data and sends the answer data to the requester terminal, which corresponds to the requester information corresponding to the request identification information on the information request data, via the network.

3. The information providing system according to claim 1, wherein the delivery control unit receives a response of the detection processing result for the detection processing request and, if the response is received, sends the detection processing result as providable data, if a number of detection processing results has reached a predetermined number, if a predetermined time has been reached, or if a score that indicates a matching degree for the information request has reached a predetermined score for each provision candidate data in the detection processing result.

4. An information providing method using a data processing device, the method comprising:

searching a data storage unit in which store data and responder information for identifying responding persons are stored in correlated manner to each other, based on an information request received from a requester terminal and extracting provision candidate data, which is a candidate for an answer to be provided to a requester, in correspondence with the information request, from the data storage unit;

combining the provision candidate data with responder information, related to each store data corresponding to the provision candidate data, to produce a detection processing result;

determining a responder for each store data in the detection processing result, creating display data, which includes the content of the information request and the provision candidate data, for each determined responder, and outputting the created display data; and receiving information on permission or non-permission of information provision regarding the extracted provision candidate data from the responding person who confirmed the display data, creating answer data for the information request based on the information on permission or non-permission of information provision and the extracted provision candidate data, and controlling sending of the created answer data to the requester terminal, the created answer data being supplied as information provision to the requester, wherein there are provided a plurality of sets of the data processing device and the data storage unit, the method comprising analyzing a content of an information request from a requester, extracting provision candidate data from store data stored in the data storage unit, combining the provision candidate data, store data corresponding to the provision candidate data, and responder information related to each item of the store data, and outputting the combined information as a detection processing result; and receiving the content of the information request and the detection processing result from the detection processing step, determining a responder for each item of store data in the detection processing result, outputting display data, which includes the content of the information request, the provision candidate data, and store data corresponding to the provision candidate data, to a responder terminal for each determined responder, receiving instruction information that is entered from the responder terminal and that indicates permission or non-permission on provision of the provision candidate data that is produced as the detection processing result, determining whether or not there is providable data based on the detection processing result and the instruction information, and outputting providable data based on a determination result, the information providing system further comprising an consolidated processing device that is connected to the plurality of data processing devices and a plurality of requester terminals via a network and that comprises receiving means, delivery control means, and answer generating means, wherein the method further comprises:

the delivery control means delivering an information request from the requester terminal, which is accepted by the receiving means, to one or more data processing devices, the delivery control means receiving providable data that is searched for by the detection processing means of the data processing device and that is output from the respondent control means of the data processing device, and the answer generating means creating answer data from the providable data and sending the created answer data to the requester terminal via the network as a response to the information request,
wherein
a storage device connected to the consolidated processing device comprises:
a delivery destination storage unit that stores delivery information identifying the plurality of data processing devices;
a result storage unit that stores processing results of the data processing devices; and
a requester information storage unit that stores requester information, which is information identifying requesters, and related communication information on requester terminals, the method comprising:
in the consolidated processing device,
the receiving means receiving an information request sent from the requester terminal via the network, assigning request identification information to the information request, identifying requester information by referencing the requester information storage unit, and establishing a correspondence between the request identification information and the requester information,
the delivery control means identifying a plurality of data processing devices, which are delivery destinations, from the delivery information stored in the delivery destination storage unit and delivering the request identification information and the information request to the identified data processing devices via the network as a detection processing request,
the data processing device receiving the detection processing request delivered from the consolidated processing device via the network,
the data processing device searching the data storage unit for a set of data related to the content of the information request, extracting a set of provision candidate data corresponding to the information request, combining the extracted set of provision candidate data with attribute information that includes responder information related to data in the set of provision candidate data to create a detection processing result, and sending the detection processing result, as well as the request identification information, to the delivery control means of the consolidated processing device,
in the consolidated processing device, the delivery control means receiving a response that is the detection processing result created for the detection processing request and, if the response is obtained, determining whether or not there is a data processing device that is a sending destination, to which a providable data request for requesting providable data is to be sent, according to the detection processing result, and
if it is determined that there is a sending destination, sending the detection processing result, as well as the request identification information and the requester information, to the data processing device, which is determined to be the sending destination, via the network as the providable data request,
the respondent control means of the data processing device, which has received the providable data request from the delivery control means of the consolidated processing device, determining a responder of each provision candidate data from the detection processing result, creating display data, which includes the content of the information request data, requester information, and provision candidate data, for the responder, and outputting the created display data to the responder terminal,
the respondent control means receiving an input of instruction information on permission or non-permission on provision of the provision candidate data, produced as the detection processing result, from the responder terminal, determining providable data, based on the instruction information and the detection processing result, to produce providable data, and sending the providable data, as well as the request identification information, to the consolidated processing device,
the consolidated processing device transferring the providable data, received from the respondent control means of the data processing device, to the delivery control means,
the delivery control means of the consolidated processing device collecting providable data for the request identification information and transferring the collected providable data to the answer generating means, and
the answer generating means generating answer data from the data, received from the respondent control means, as a response to the information request and sending the answer data to the requester terminal, which corresponds to the requester information corresponding to the request identification information on the information request data, via the network,
generating answer data if a number of items of providable data has reached a predetermined number or if a predetermined time has been reached, and the answer data is sent to a requester terminal that corresponds to the requester information corresponding to the information request.

5. The information providing method according to claim 4, wherein
a storage device connected to the consolidated processing device comprises:
a delivery destination storage unit that stores delivery information identifying the plurality of data processing devices;
a result storage unit that stores processing results of the data processing devices; and
a requester information storage unit that stores requester information, which is information identifying requesters, and related communication information on requester terminals, the method comprising:
in the consolidated processing device,
the receiving means receiving an information request sent from the requester terminal via the network, assigning request identification information to the information request, identifying requester information by referencing the requester information storage unit, and establishing a correspondence between the request identification information and the requester information,
the delivery control means identifying a plurality of data processing devices, which are delivery destinations, from the delivery information stored in the delivery destination storage unit and delivering the request identification information and the information request to the identified data processing devices via the network as a detection processing request,
the data processing device receiving the detection processing request delivered from the consolidated processing device via the network,
the data processing device searching the data storage unit for a set of data related to the content of the information request, extracting a set of provision candidate data corresponding to the information request, combining the extracted set of provision candidate data with attribute information that includes responder information related to data in the set of provision candidate data to create a detection processing result, and sending the detection processing result, as well as the request identification information, to the delivery control means of the consolidated processing device, in the consolidated processing device, the delivery control means receiving a response that is the detection processing result created for the detection processing request and, if the response is obtained, determining whether or not there is a data processing device that is a sending destination, to which a providable data request for requesting providable data is to be sent, according to the detection processing result, and if it is determined that there is a sending destination, sending the detection processing result, as well as the request identification information and the requester information, to the data processing device, which is determined to be the sending destination, via the network as the providable data request, the respondent control means of the data processing device, which has received the providable data request from the delivery control means of the consolidated processing device, determining a responder of each provision candidate data from the detection processing result, creating display data, which includes the content of the information request data, requester information, and provision candidate data, for the responder, and outputting the created display data to the responder terminal, the respondent control means receiving an input of instruction information on permission or non-permission on provision of the provision candidate data, produced as the detection processing result, from the responder terminal, determining providable data, based on the instruction information and the detection processing result, to produce providable data, and sending the providable data, as well as the request identification information, to the consolidated processing device, the consolidated processing device transferring the providable data, received from the respondent control means of the data processing device, to the delivery control means, the delivery control means of the consolidated processing device collecting providable data for the request identification information and transferring the collected providable data to the answer generating means, and the answer generating means generating answer data from the data, received from the respondent control means, as a response to the information request and sending the answer data to the requester terminal, which corresponds to the requester information corresponding to the request identification information on the information request data, via the network.

6. The information providing method according to claim 4, comprising:

when a response of the detection processing result for the detection processing request is received and, if the response is obtained, sending the detection processing result as providable data if a number of detection processing results has reached a predetermined number, if a predetermined time has been reached, or if a score that indicates a matching degree for the information request has reached a predetermined score for each provision candidate data in the detection processing result.

7. The information providing method according to claim 4, wherein the data processing device is connected to the responder terminal via a network for communication, in the data storage unit, store data and related responder information for identifying responders are stored in correlated manner to each other, the system further comprises a requester information storage unit that stores requester information, which identifies requesters, and related communication information on requester terminals; and a responder information storage unit that stores the responder information and related communication information on responder terminals, the method comprising:

receiving an input entered from the requester terminal via the network as an information request, assigning request identification information as information identifying the information request, identifies the requester information by referencing the requester information storage unit, and establishes a correspondence between the request identification information and the requester information, receiving the information request, the request identification information, and the requester information, analyzing the content of the information request, searching data stored in the data storage unit for a set of data related to the content of the information request, extracting a set of provision candidate data corresponding to information request data from the set of related data, combining the extracted set of provision candidate data with attribute information that includes responder information related to data in the set of provision candidate data to create a detection processing result, and outputting the detection processing result, as well as the content of the information request, the request identification information, and the requester information;

identifying responder information corresponding to the provision candidate data for each provision candidate data by referencing the responder information storage unit based on the detection processing result, creating display data, which includes the content of the information request, the requester information, and the provision candidate data, for each responder and outputting the created display data to the corresponding responder terminal via the network, receiving the instruction information that is from the responder terminal and that indicates permission or non-permission on provision of the provision candidate data, determining whether or not there is providable data based on the instruction information and the detection processing result, and outputting the providable data as well as the request identification information; and generating answer data from the data that is output and sending the answer data to the requester terminal, which corresponds to the requester information corresponding to the request identification information on the information request, via the network as a response to the information request.

8. A non-transitory computer readable recording medium having recorded thereon a computer program that causes a data processing device in a computer system comprising the data processing device and a data storage unit that stores data, to execute:

a processing of searching the data storage unit based on an information request received from a requester terminal and extracting provision candidate data, which is a candidate for an answer to be provided to a requester in correspondence with the information request, from the data storage unit;

a processing of combining the provision candidate data with responder information, related to each store data corresponding to the provision candidate data, to produce a detection processing result; determining a responder for each store data in the detection processing result, creating display data, which includes the content of the information request and the provision candidate data, for each determined responder, and outputting the created display data; and a processing of receiving information on permission or non-permission of information provision regarding the extracted provision candidate data from the responding person who confirmed the display data, creating answer data for the information request based on the information on permission or non-permission of information provision and the extracted provision candidate data, and controlling sending of the created answer data to the requester terminal, wherein the data processing device is connected to the responder terminal via a network for communication, the data storage unit stores store data and related responder information for identifying responders, the system further comprises a requester information storage unit that stores requester information, which identifies requesters, and related communication information on requester terminals; and a responder information storage unit that stores the responder information and related communication information on responder terminals, the program causes the data processing device to execute:

a processing of receiving an input entered from the requester terminal via the network as an information request, assigning request identification information as information identifying the information request, identifying the requester information by referencing the requester information storage unit, and establishing a correspondence between the request identification information and the requester information, a processing of receiving the information request, the request identification information, and the requester information, analyzing the content of the information request, searching data stored in the data storage unit for a set of data related to the content of the information request, extracting a set of provision candidate data corresponding to information request data from the set of related data, combining the extracted set of provision candidate data with attribute information that includes responder information related to data in the set of provision candidate data to create a detection processing result, and outputting the detection processing result as well as the content of the information request, the request identification information, and the requester information;

a processing of identifying responder information corresponding to the provision candidate data for each provision candidate data by referencing the responder information storage unit based on the detection processing result, creating display data, which includes the content of the information request, the requester information, and the provision candidate data, for each responder and outputting the created display data to the corresponding responder terminal via the network, receiving instruction information that is from the responder terminal and that indicates permission or non-permission on provision of the provision candidate data, determining whether or not there is providable data based on the instruction information and the detection processing result, and outputting the providable data as well as the request identification information; and a processing of generating answer data from the data that is output and sending the answer data to the requester terminal, which corresponds to the requester information corresponding to the request identification information on the information request, via the network as a response to the information request.

* * * * *